United States Patent [19]

Van Vliembergen et al.

[11] Patent Number: 5,784,489
[45] Date of Patent: Jul. 21, 1998

[54] APPARATUS AND METHOD FOR SYNTACTIC SIGNAL ANALYSIS

[75] Inventors: Eduardus J.W. Van Vliembergen, Venlo; Robertus P.E.H. Heemels, Roermond; Louis M.G. Cremers, Venlo; Frederik J. Hommersom, Venlo; Jan Gerritsen, Nijmegen, all of Netherlands

[73] Assignee: Oce-Nederland, B.V., Venlo, Netherlands

[21] Appl. No.: 674,732

[22] Filed: Jul. 2, 1996

Related U.S. Application Data

[62] Division of Ser. No. 562,787, Nov. 27, 1995, Pat. No. 5,550,934, which is a continuation of Ser. No. 196,570, Feb. 15, 1994, abandoned.

[30] Foreign Application Priority Data

| Feb. 19, 1993 | [NL] | Netherlands | 9300310 |
| Mar. 29, 1993 | [EP] | European Pat. Off. | 93200893 |

[51] Int. Cl.$^6$ .................................................. G06K 9/46
[52] U.S. Cl. ................................................ 382/192
[58] Field of Search ......................... 382/160, 181, 382/204, 209, 217, 218, 220, 221, 222, 223, 224, 226, 229, 228, 230, 231, 225; 395/50, 54, 62, 63

[56] References Cited

U.S. PATENT DOCUMENTS

| 4,754,489 | 6/1988 | Bokser | 382/225 |
| 4,773,099 | 9/1988 | Bokser | 382/225 |
| 4,837,842 | 6/1989 | Holt | 382/204 |
| 4,907,285 | 3/1990 | Nakano et al. | 382/175 |
| 4,933,984 | 6/1990 | Nakano et al. | 382/176 |
| 5,020,112 | 5/1991 | Chou | 382/226 |
| 5,060,277 | 10/1991 | Bokser | 382/225 |
| 5,077,807 | 12/1991 | Bokser | 382/160 |
| 5,133,023 | 7/1992 | Bokser | 382/226 |
| 5,197,107 | 3/1993 | Katsuyama et al. | 382/209 |
| 5,261,009 | 11/1993 | Bokser | 382/228 |
| 5,317,647 | 5/1994 | Pagallo | 382/161 |
| 5,329,405 | 7/1994 | Hou et al. | 382/218 |
| 5,343,537 | 8/1994 | Bellegarda et al. | 382/209 |
| 5,347,595 | 9/1994 | Bokser | 382/225 |
| 5,359,673 | 10/1994 | de La Beaujardiere | 382/229 |

FOREIGN PATENT DOCUMENTS

| 0357344 | 3/1990 | European Pat. Off. |
| 0513918 | 11/1992 | European Pat. Off. |

OTHER PUBLICATIONS

"Solving Grammatical Ambiguities Within a Surface Syntactical Parser for Automatic Indexing." Laboratoire Genie Informatique de Grenoble (IMAG) B.P. 68-38402, pp. 123–130.
Image Understanding Systems—Syntactic Methods, pp. 574–579.
Syntactic Linguistic Pattern Recognition, K.S. Fu, pp. 95–134.
The Generalized LR Parser/Compiler V8–4: A Software Package for Practical NL Projects, Masaru Tomita, Carnegie Mellon Univ., pp. 59–63.

*Primary Examiner*—Jose L. Couso

[57] ABSTRACT

An apparatus and method for syntactic signal analysis which is suitable for processing signals which deviate, within a freely selected margin, from a set of signals predetermined by a grammar, the apparatus being provided with a feature unification mechanism which detects violations of features, and an adaptive threshold mechanism coupled thereto. The feature unification mechanism, which processes the features in groups so that rapid processing is obtained, determines a violation score, thus providing a measure of the deviation of the analyzed signal from the set of signals predetermined by the grammar and indicates what elements of the signal are not satisfactory so that these can be corrected if necessary. The adaptive threshold mechanism enables a number of analyses to be delivered each having a violation score, so that on the basis thereof, in combination with other factors which may be available, it is possible to select the best analysis. The apparatus is applicable to signal correction, signal verification and signal recognition.

16 Claims, 11 Drawing Sheets main routine
parsing unit parsing routine actor routine shift routine reducing routine unification routine method for converting a pixel pattern into a series of primitives FIG. 9a: normalized primitives:
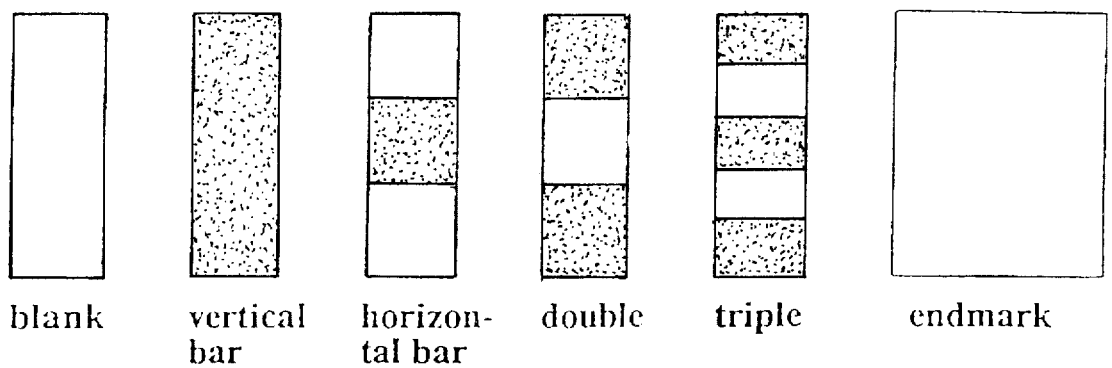
blank   vertical   horizon-   double   triple   endmark
        bar        tal bar
FIG. 9b: features:
vertical bar:   center
                long up
                long down
                normal
                bold
horizontal bar: high-center
                low-center
                high
                low
                center
double:         high
                center
                low
triple:         high
                center
                low
                ascending
                flat
                descending
FIG. 9c: primitive:
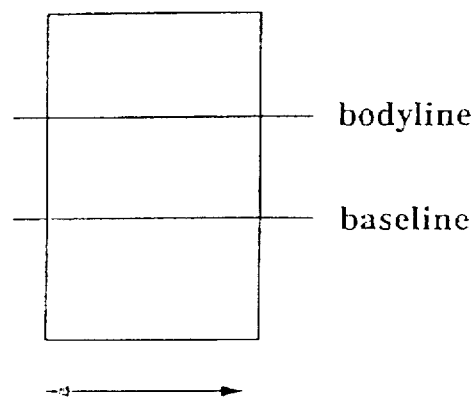
width
FIG. 9d: example of a string of primitives
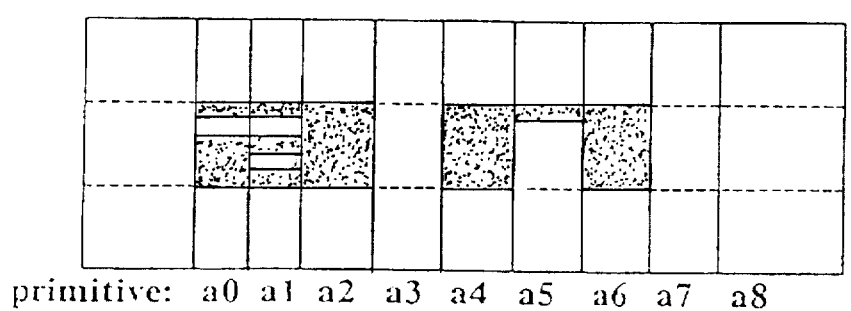
primitive: a0 a1 a2 a3 a4 a5 a6 a7 a8 a: double (CENTER) triple (CENTER) vbar (CENTER)
s: double (CENTER) triple (CENTER, DESC) double (CENTER)
z: double (CENTER) triple (CENTER, ASC) double (CENTER)

method for derivation of a scheme of feature indicators

APPARATUS AND METHOD FOR SYNTACTIC SIGNAL ANALYSIS

This application is a division of application Ser. No. 08/562,787 filed Nov. 27, 1995, U.S. Pat. No. 5,550,934, which is a continuation of application Ser. No. 08/196,570 filed Feb. 25, 1991, now abandoned.

BACKGROUND OF THE INVENTION

1. Field of the invention

The present invention relates to signal analysis, and more specifically, to an apparatus and method for syntactic signal analysis. The invention includes a method for coding features, and a method for converting a pixel pattern representing lines of text obtained by means of an optical scanner, into a string of primitives and features suitable for pattern recognition.

2. Discussion of Related Art

Signals are processed in a large number of technical fields. However, these signals are sometimes mutilated caused by various reasons. In most cases, it is advantageous to have available unmutilated signals. If it is known beforehand that the unmutilated signals must satisfy certain rules, it is possible to check whether the available signals really do satisfy these rules and, if this does not appear to be the case, to discard or correct the signals.

A technique known in the art for checking whether signals satisfy certain rules is the syntactic method or parsing technique. For an introduction to this see, respectively, "Digital Pattern Recognition", Springer-Verlag (1980), by K. S. Fu (editor), pp. 95–134, and "Digital image processing", John Wiley & Sons (1978), by W. K. Pratt, pp. 574–578. In this method, the signal is first segmented into primitive elements. These primitive elements, which will hereinafter be designated primitives, are then classified and replaced by a normalized primitive. A normalized primitive of this kind is a prototype of a certain class or category. A check is then made whether a string of normalized primitives obtained in this way satisfies a grammar. A grammar comprises a number of rules, known as rewriting or production rules, each consisting of a number of terms, terminals or non-terminals, and each predetermining a way in which a set of terms may be rewritten to form a non-terminal. The grammar also defines a starting symbol. The starting symbol is a non-terminal. The defined classes or categories and accordingly the normalized primitives correspond one by one to the terminals from the grammar.

A bottom-up parsing procedure consists of applying suitable rewriting rules to a string of normalized primitives and to intermediately obtained rewriting results until the starting symbol is obtained. The application of rewriting rules in each case means joining simpler terms together to form more complex terms and finally results in a hierarchal composition of the signal in the form of a tree structure, also known as a parsing tree, solution tree or analysis, having the starting symbol at the root, the normalized primitives at the leaves, and the non-terminals of the applied rewriting rules at the intermediate nodes. The grammar defines all such hierarchical compositions which are permissible.

If at a certain time it is not possible to apply any further rewriting rule in the parsing procedure when the starting symbol has not yet been found, then the signal does not comply with the grammar and the signal is rejected. It is then possible to adapt one or more primitives or normalized primitives so that the rules in the grammar are complied with: the signal is then corrected. A correction method of this kind is shown in "Digital Image Processing", by W. Pratt, p. 571, FIG. 20.2–3.

If the parsing procedure actually delivers the starting symbol, then the signal complies with the predetermined rules and it has one of the permissible hierarchical compositions. If verification of the signal is all that is required, then the fact that the starting symbol has been reached is sufficient to prove that the signal complies with the rules. In the event that recognition of the signal is also the purpose of the apparatus, the objects for recognition can be derived directly from the analysis provided. An object for recognition is represented by the non-terminal symbol which is the root of a sub-tree corresponding to the object for recognition. If a signal has been converted into a string of recognized symbols in this way, then it is possible to subject the resulting symbols after some intermediate operations, if necessary, to a following parsing step in which a check is made whether the string of recognized symbols complies with another system of rules. This can in turn lead to adaptation of the symbols, and this can in turn lead to adaptation of the signal. It is also possible that this parsing step will again yield a structural description with which further processing is carried out.

Various types of parsers are known. A robust parser, i.e. a parser which also processes signals which do not comply with the rules in the grammar, together with a correction mechanism co-operating with the parser, is described in EP-A-0361570. In "Efficient parsing for natural language", Kluwer Academic Publishers (1986), M. Tomita describes a "generalized LR parser". This parsing technique is based on the LR (Left-to-right Rightmost) parsing technique, a technique generally known in the art, introduced by Knuth in 1965. Tomita extended this LR technique by making it suitable for ambiguous input, in which case the parser is capable of giving more than one structural description for such an input. An example of ambiguous input in natural language is the input sentence: "He saw a man with a telescope", in which the phrase "with a telescope" may be either an adverbial clause qualifying the verb "saw", or an adjectival clause qualifying the noun "man". The GLR parser is at the present time one of the quickest and most efficient parsing techniques.

There are a number of technical fields in which the parsing technique is applicable for checking and correcting signals. Optical character recognition systems are systems intended to read text in by means of an optical scanner and convert it to a form which can be processed by a computer. The electrical signal delivered by the optical scanner is thresholded and stored in a memory in a pixel pattern. This pixel pattern will not be an accurate image of the original, for example because of inaccuracies in the optical system, uneven illumination, or rounding-off errors during thresholding. It is also possible that the original for scanning is of poor quality, the characters are eroded, mutilated, or are handwritten characters. It is well known, however, that the signal obtained must represent characters. This knowledge can be utilized by having a parser check whether the pixel pattern actually has structures which represent characters. For this purpose, the pixel pattern must be converted to a series of primitives and normalized primitives, which normalized primitives correspond directly to terminals from the grammar, whereupon the terminals are tested against the rewriting rules of the grammar. In "Digital Pattern Recognition" by K. S. Fu (editor), p.103 gives primitives for handwritten English characters and p.110 ff. gives a number of grammars which describe specific patterns.

A following field of application is the field of object recognition. If only a small number of objects has to be recognized, it is possible to compare the input signal originating from a detection means with all the permissible objects and to decide which object best agrees with the input signal. If, however, a large number of objects is involved, it is more advantageous to describe each object as a set of primitive elements. These description rules form the grammar. An input signal is segmented into the primitive elements and then a parser checks whether the rules of the grammar are complied with and the parsing process delivers as a result what object corresponds to the structure found. In "Digital Pattern Recognition" by K. S. Fu (editor), p.113 inter alia describes a grammar for the recognition of chromosomes.

The syntactic method can also be advantageously used in speech recognition. In "Digital Pattern Recognition" by K. S. Fu (editor), p.177 gives an example of a speech recognition system. In this apparatus an acoustic processor is followed by a linguistic processor. After a number of processing operations the acoustic processor delivers a string of phonemes. This string of phonemes is fed to the linguistic processor which, inter alia on the basis of syntactic rules, converts the string of phonemes into a string of words.

Another example of a technical field in which parsing techniques are applicable for checking and correcting signals is the area of "natural language interface" systems. A system of this kind is aimed at assisting man in his interaction with a computer system. This is of the greatest importance, for example, for enabling the layman to consult a database. A "natural language interface" of this kind must allow the user to formulate complex questions in natural language. Sentences input by the user in natural language are analyzed by a parser and then deliver a number of questions in a form suitable for feeding to the database. A system of this kind is discussed in the textbook by M. Wallace: "Communicating with databases in Natural Language", Wiley & Sons Inc. (1984).

European application EP-A-0 513 918 describes a spelling checking system. The use of a parser for this application makes such spelling checking systems more versatile and more accurate. It is not just an isolated word that is checked but also the inflections of the words and the syntax of the sentence. As a result, a number of possible alternatives for a wrongly spelled word are very greatly reduced. In addition, a parser is, by the nature of things, also a suitable instrument for use as a grammar checker for a natural language.

In machine translation systems, parsers are suitable for analyzing the sentence for translation and to synthesize a translated sentence from the translated words with their grammatical functions. The use of a parser in such an application will be found in EP-A-0 357 344.

It is also possible, using a parser, to reconstruct mutilated signals originating from a corrupt mass memory system or a poor communication channel since the signals obey rules that are known beforehand.

A parser can also advantageously be used for indexing systems. The object of this type of system is to make a list of index words for a set of texts. For this purpose, nouns and verbs reduced to a normalized form (e.g. singular and infinitive respectively) are extracted from the texts by means of a parser. A system of this kind is described in the article by C. Berrut and P. Palmer: "Solving grammatical ambiguities within a surface syntactical parser for automatic indexing", ACM Conference on Research and Development in Information Retrieval (1986).

As is apparent from the foregoing, the parsing technique is applicable to a large number of areas of the art.

An important improvement in parsing techniques is obtained by using feature unification. Primitives from which the input signal is constructed are provided with features for this purpose. These features specify a primitive in greater detail. For this purpose the terms from the grammar rules are also provided with features. During the parsing process the features of the primitives are tested against the features of the corresponding terms in the grammatical rules. The features can also be passed on to terms which can then in turn be further tested in the parsing process against a following applicable grammatical rule. Feature unification enables more complex structures to be processed with parsing techniques.

An example of feature unification is described in the article "The Generalized LR Parser/Compiler V8-4: A software package for practical NL projects", published in Proceedings of the Coling-90, Helsinki 1990, by M. Tomita. However, a disadvantage of the method described there for performing feature unification is the complexity of the features processing. Although a parser can, in this way, be made suitable for processing more complex structures, it is very detrimental to the utility of the parsing method for practical purposes since a large number of extra steps must be added to the parsing method.

SUMMARY OF THE INVENTION

Therefore, it is an object of the present invention to provide an apparatus for signal analysis which will overcome the above noted disadvantages.

It is a further object of the invention to provide an improved apparatus for syntactic signal analysis suitable for the above-described fields of application, by providing an improved and more versatile unification mechanism.

Still, a further object of the present invention is to provide an improved method for syntactic signal analysis.

The foregoing objects and others are accomplished in accordance with the present invention, generally speaking, by providing an improved syntactic signal analysis apparatus comprising a conversion unit for converting an input signal to primitives and to normalized primitives corresponding to the primitives, a pattern recognition unit connected to the conversion unit, for providing a syntactic analysis of, in each case, a string of normalized primitives by reference to a grammar, and a memory unit for storing the grammar, said grammar comprising terms which are ordered in rewriting rules and which also comprise terminals corresponding to normalized primitives.

According to the invention, the conversion unit comprises feature-extraction means for deriving features from each primitive, for joining the features derived from each primitive together to form current feature groups and for assigning the current feature groups to the normalized primitives corresponding to the primitive, the grammar comprises declared feature groups associated with the terms, and the pattern recognition unit comprises means for unification of the current and declared feature groups.

The principle of the invention is based primarily on the realization that the unification of features can be efficiently effected by including features in the grammar in groups and then carrying out unification on the feature groups.

The processing of features for unification can now be effected considerably more quickly since the features no longer have to be processed separately.

An advantageous embodiment according to the instant invention has a pattern recognition unit that includes for assigning a violation score to the syntactic analysis on the basis of unification of the current and declared feature groups. In this way, the group processing of features is extended by a violation mechanism which records violations of the features. If the parser delivers an analysis, it is in this way possible to indicate in the analysis which primitives do not comply with required features.

Another embodiment according to the invention includes means for breaking off parsing if the violation score exceeds a threshold value, and means for raising the threshold value if the violation score exceeds the threshold value and means for re-starting parsing. If the violation score exceeds a given threshold value parsing is broken off. The threshold value is then increased to a value determined by the value of the violation score summed up with a constant value. Parsing then restarts. Consequently, in a number of parsing runs one or more analyses are finally delivered provided with a violation score. The delivered analyses are precisely those analyses which have the lowest possible violation score within a given margin. These steps result in an adaptive threshold mechanism so that the applicability of the parsing mechanism for signal analysis is greatly increased. Violations of the features are permissible to an optionally adjustable degree. Signals for analysis may deviate from the grammatical rules but yet be analyzed and corrected if necessary. The degree to which deviations are tolerated by the apparatus is adjustable according to the purpose of the apparatus. The parsing mechanism, which by its nature is rigid, has become very flexible as a result of these steps.

A further improvement of the apparatus according to the invention is obtained by the fact that the apparatus comprises correction means which are activated if the violation score is unequal to zero. This correction step can advantageously make use of the violations indicated in the analysis.

A adjunct improvement of the apparatus according to the invention is obtained by representing feature groups by a binary number. Binary coding of feature groups gives extremely fast processing and compact storage.

BRIEF DESCRIPTION OF THE DRAWINGS

The invention will now be explained in detail with reference to a number of drawings, wherein:

FIGS. 9a to 9d show definitions of terminals and features suitable for application to the field of character recognition, and a string of primitives;

DETAILED DESCRIPTION OF THE INVENTION

Figure 1:
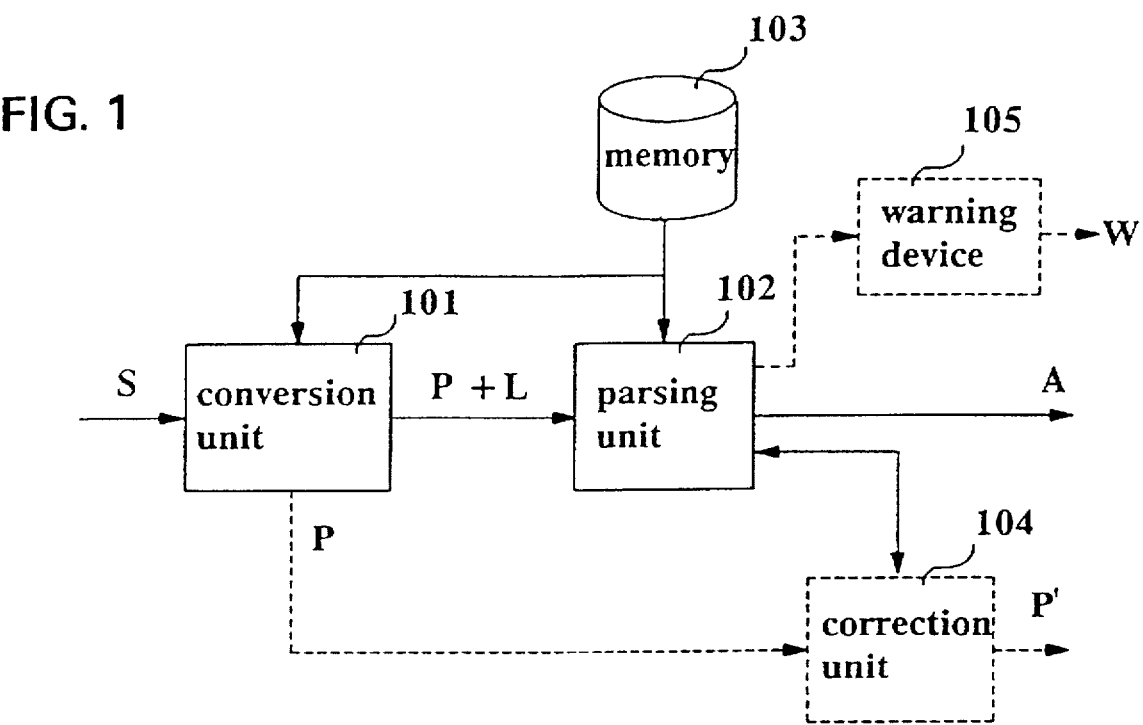
FIG. 1 is a block schematic diagram of an apparatus according to the invention.
Figure 2:
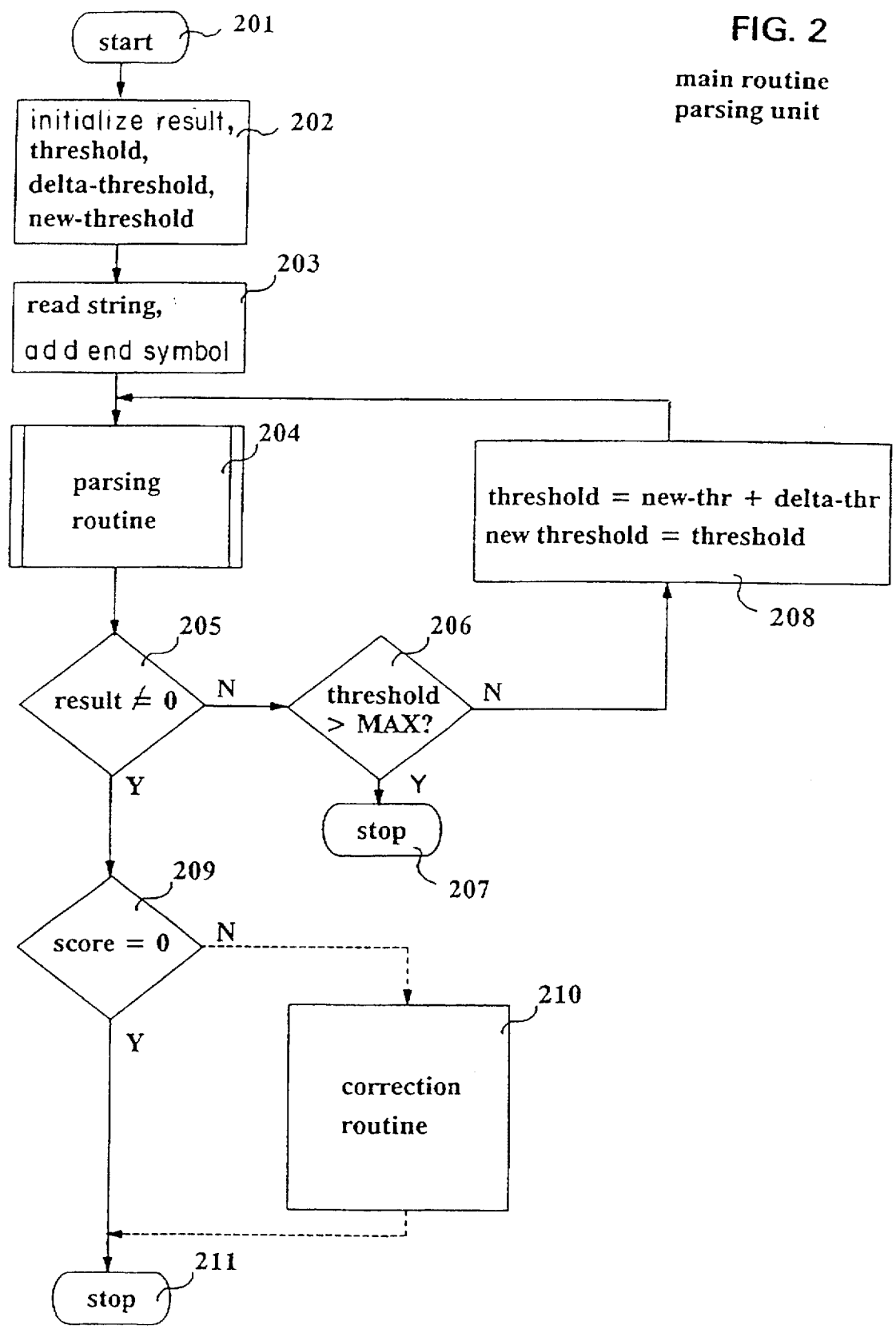
FIG. 2 is a flow diagram of a main routine of a parsing unit.

FIG. 1 illustrates an apparatus according to the present invention. A signal S for analysis is fed to a conversion unit 101. The conversion unit converts the signal S into a stream of primitives P and a stream L of normalized primitives and current feature groups. This lexicalized stream L is fed, in combination with the primitive stream P if required, to the parsing unit 102. The parsing unit 102 in each case reads in a part of the stream and verifies whether the part that has been read in, comprising a string of normalized primitives and current feature groups, satisfies a grammar. This grammar is in the form of a number of tables stored in the memory 103. If the string satisfies the grammar, one or more analyses A are delivered by the parsing unit. An analysis gives a structural description, as permitted by the grammar, of that part of the input signal which corresponds to the read-in string. In the event of verification showing that prescribed features have been violated, the parsing unit increases a violation score. In such a case, the analyses found are delivered by the parsing unit together with the associated violation score. The analyses delivered by the parsing unit are then available for further processing, together with the original signal S, the stream of primitives P and the lexicalized stream L.

A modification of the apparatus is obtained by providing a correction unit 104 denoted by broken lines in FIG. 1. If the parsing unit does not deliver a solution or if it delivers only solutions with which the violation score is unequal to zero and it has accordingly been found that features have been violated, this correction unit is invoked, so that a correction mechanism is activated. The correction mechanism can be constructed in various ways. According to a first embodiment, correction takes place by modification of the analyses delivered by the parsing unit. According to a second embodiment, the primitives are corrected on the basis of information given by the parsing unit relating to violated features. The apparatus then delivers a corrected stream of primitives P'. If necessary, this corrected stream of primitives P' is in turn fed to the parsing unit.

In a following modification, the apparatus is also provided with a warning device 105 which is activated by the parsing unit. If the parsing unit finds that the input signal S deviates excessively from the rules specified in the grammar, the warning device delivers the signal W.

If the apparatus is constructed as an optical character recognition system, then conversion unit 101 also comprises a photo-electric converter to convert the optical input signal S by means of a scanning mechanism into an electrical signal which is then segmented into the stream of primitives P. The primitives are mapped on normalized primitives and, provided with current feature groups, are fed to the parsing unit. By reference to the grammar the parsing unit determines what pattern of primitives symbolizes a specific character and exports the successively recognized characters.

If the apparatus is constructed as a grammar checking and correction system the input signal is a text data stream. Conversion unit 101 segments this data stream into words and then determines the normalized primitives (linguistic categories) and current feature groups (linguistic properties). The parsing unit then reads in the lexicalized stream sentence by sentence and checks whether each sentence satisfies the syntax specified in the grammar. In the event of any violations, the correction unit modifies the primitives on the basis of the detected violations of the features. The corrected stream of primitives P' is then exported.

It is possible to improve the previously described optical character recognition system by feeding the recognized characters to a spelling corrector which is advantageously equipped with the described grammar checking and correction system.

It should be noted that the utility of the apparatus is not confined to the application areas described hereinbefore. The apparatus can advantageously be applied to all those fields in which signals have to be analyzed for recognition or for verification and where an a priority requirement is that these signals obey specific rules.

The method performed by the apparatus of the present invention will now be explained in greater detail with reference to FIGS. 1 to 8.

A signal S for analysis is fed to the conversion unit 101 of FIG. 1, which converts the signal into a stream of primitives P and a stream L of normalized primitives and current feature groups. The processes to be performed in the conversion unit will have different embodiments depending on the field of application. One embodiment for optical character recognition will be discussed in detail hereinafter.

The method of the parsing unit will now be explained with reference to FIGS. 2 to 7. The main routine of the parsing unit according to the invention is explained in detail with reference to the flow diagram of FIG. 2. Starting from the starting position 201, in step 202 the variables result, threshold and new-threshold, are initially set to zero and the variable delta-threshold is initially set to DELTA. In step 203, part of the lexicalized stream L is read in, comprising a series of normalized primitives provided with current feature groups, and an end symbol $ is added to the string. Then, in step 204, the parsing routine is invoked. (The parsing routine will be explained in detail hereinafter with reference to FIG. 3.) The parsing routine verifies whether the read-in string satisfies the grammar stored in the memory in the form of a number of tables. If it does, one or more analyses in the form of a tree structure, in which each analysis has a separate root node, is delivered and the variable result contains pointers to the root nodes. If the parsing routine has not found an analysis, then the variable result contains the value 0. In step 205 a check is then made whether the variable result has a value unequal to 0. If not (N), the method is continued by performing step 206 in which a check is made whether the variable threshold has a value greater than a predetermined value MAX. If so (Y), the main routine reaches the end state 207. In this state the parsing unit has not been able to find an analysis and the input signal must be rejected as not being in conformity with the prescribed rules, at least not within the margin of the number of violations permitted by the value of MAX. The fact that verification is unsuccessful can be further used, for example, to activate a warning device. If the variable threshold does not exceed the value MAX (N), then the sum of new-threshold and delta-threshold is assigned to the variable threshold in step 208. During the performance of the parsing routine the violation score has been assigned to new-threshold. Delta-threshold has a preset value. Consequently, in a small number of steps with respect to the situation in which the variable threshold is increased by the same step in each case, analyses are found with a minimum number of violations, given the situation, and with a certain spread in the number of violations, this spread being determined by the value of delta-threshold. After performing step 208, the parsing routine is again invoked. If in step 205 the variable result has a value unequal to zero (Y), a check is made in step 209 whether the violation score is zero. If not (N), a correction routine is invoked in step 210. The embodiment of the correction routine depends on the application area. Advantageously, the correction routine can make use of the analyses delivered by the parsing routine, which analyses indicate those reduction steps where violations of the rules have been found. The main routine of the parsing unit then reaches end state 211, whereafter the analyses obtained and the corrected signals are available for further processing. If in step 209 the number of violations is equal to zero (Y), then the end state 211 is immediately reached.

Figure 3:
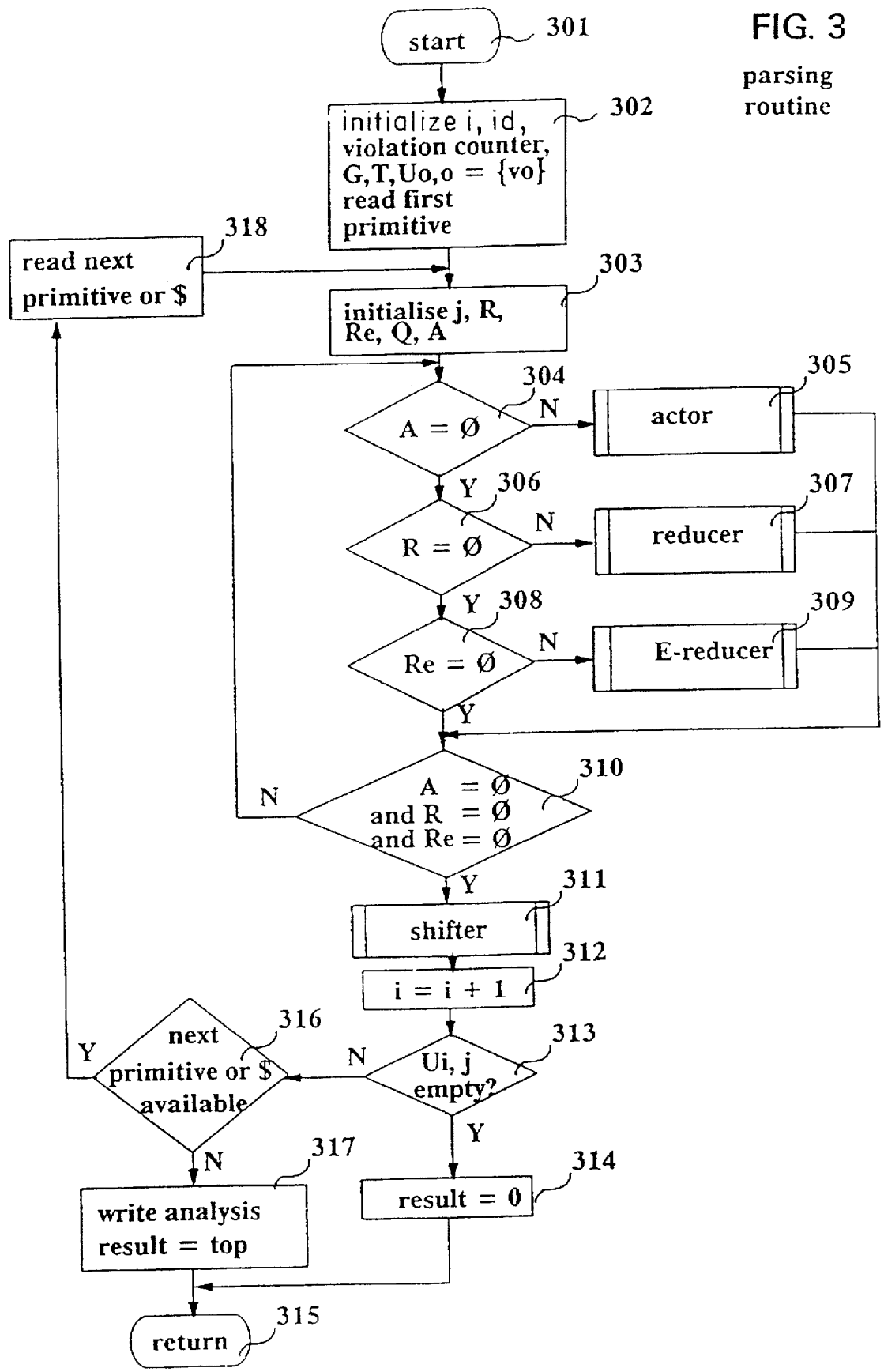
FIG. 3 is a flow diagram of a parsing routine.

FIG. 3 shows an embodiment of the parsing routine. Starting from the starting position 301, in step 302 the primitive counter i, the counter id, the violation counter, the graph-structured stack G and the analysis tree T are initialized and the element v0 is added to the set U0,0: U0,0 {v0}. This element v0 is assigned the state s=0. Also, in this step, the first primitive, provided with lexical data (normalized primitive, current feature groups) is read out of the string. In step 303 the counter j is then initially set to 0, the sets R,Re and Q initialized to the empty set and the set A is made equal to U0,0:A={v0}. In step 304 a check is then made whether A is an empty set. If not (N), the actor routine is called up in step 305. If it is the case (Y), a check is made in step 306 whether R is an empty set. If not (N), the reducing routine is called up in step 307. If it is the case (Y), a check is made in step 308 whether Re is an empty set. If not, the e-reducing routine is called up. If it is the case, step 310 is reached. Similarly, step 310 is reached after performance of one of the steps 305, 307 and 309. (The steps 305 and 307 are shown in detail in FIGS. 4 and 6 respectively.) Step 309, the e-reducing routine, has not been developed in detail but the modifications with respect to the prior art such as are required to make this routine suitable for use in the invention are similar to the changes made to the reducing routine developed in detail in FIG. 6. In step 310 a check is made whether the sets A,R and Re are all empty. If not (N) the method returns to step 304. If this is the case (Y), the shift routine is invoked in step 311. (The shift routine is developed in detail in FIG. 5 and will be explained hereinafter.) After the performance of the shift routine, the method is continued with step 312, in which the primitive counter i is increased by 1. A check is then made in step 313 whether Ui,j is empty. If it is (Y), the value 0 is allocated to the variable result in step 314 and this implies that no analysis can be found, after which end position 315 is reached. If Ui,j is not empty (N), a check is made in step 316 whether a following primitive or the end symbol is present. If so (Y), it is read in in step 318. If that is not the case (N), the analyses obtained are written away in step 317. The parsing routine then reaches end position 315, after which the method continues the performance of the parsing routine.

Figure 4:
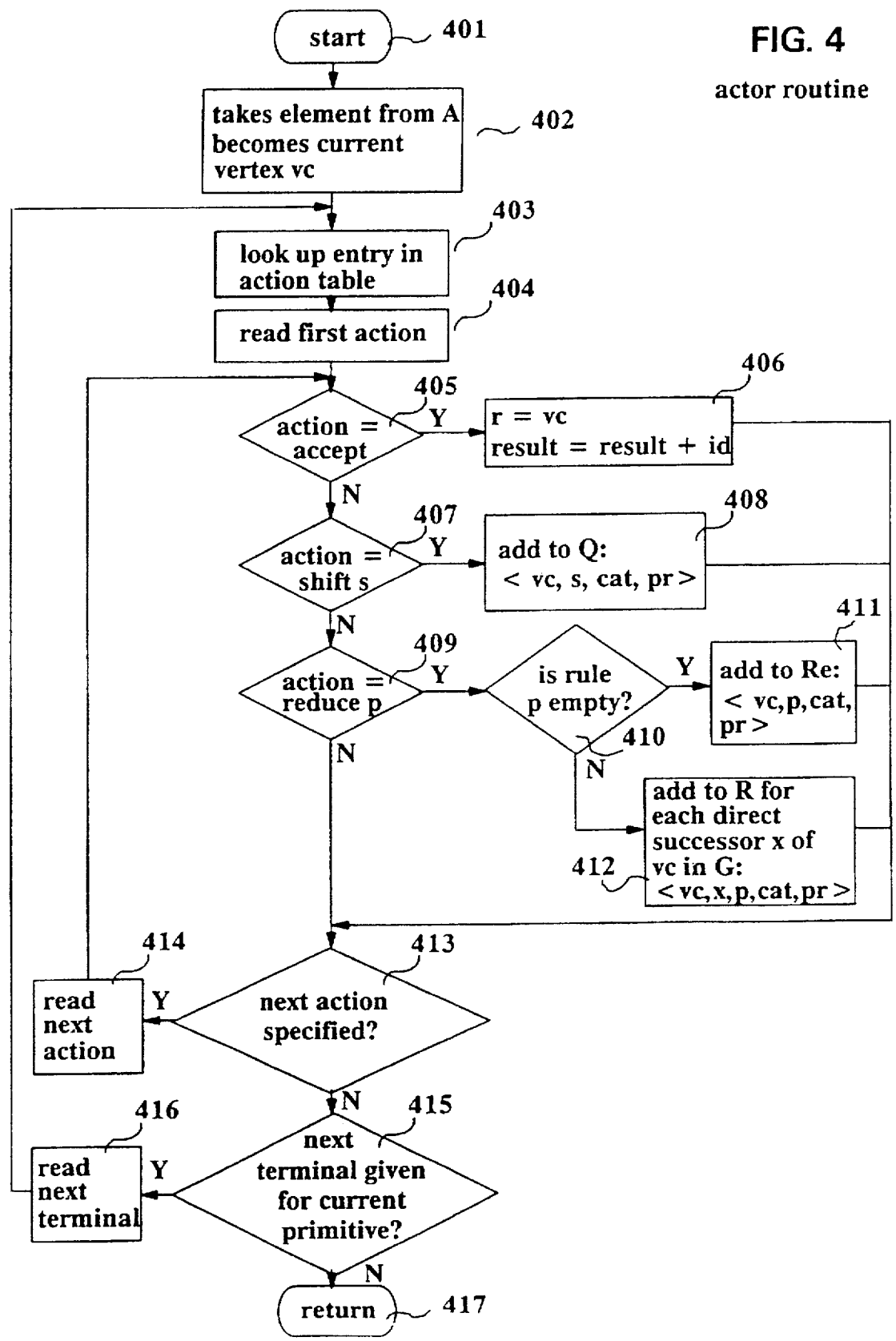
FIG. 4 is a flow diagram of an actor routine.

FIG. 4 shows an embodiment of the actor routine. Starting from the starting position 401, in step 402 a current vertex vc is determined by taking an element from the set A for the purpose. An action table is then consulted in step 403. This action table is derived from the defined grammar and specifies actions required for a given state s and a term defined in the grammar. The entry from the action table determines what action is associated with the current vertex vc. In step 404 the first action specified for this entry is then read in. A check is then made in step 405 whether the action "accept" is specified. If so (Y), vc is assigned to the variable r in step 406 and the variable result is raised by the value of id. If this is not the case (N), a check is made in step 407 whether the action "shift s" is specified. If that is the case (Y), the element <vc,s,category,primitive> is added to the set Q. If that is not the case (N), a check is made in step 409 whether the action "reduce p" is specified. If that is the case (Y), a check is made in step 410 whether rule p is an empty production rule. If rule p is in fact an empty production rule (Y), the element <vc,p,category, primitive> is added to the set Re. If rule p is not an empty production rule (N), step 412 is performed, in which an element <vc,x,p,category, primitive> is added to the set R for each direct successor x of vc in G. If in step 409 it is found that the action "reduce p" is not specified (N), then step 413 is performed. Step 413 is also performed after the steps 406, 408, 411 and 412. In step 413 a check is made whether a following action is also specified in the action table for the entry determined in step 403. If this is the case (Y), that action is read in in step 414, whereafter the method is continued by step 405. If it is not the case (N), a check is made in step 415 whether a following terminal, i.e. a following normalized primitive, applies in the case of the current primitive. If so (Y), this following terminal is read in in step 416 and the method is continued by again performing step 403. The effect of this is to enable processing of ambiguous input, i.e. primitives to which more than one category can be assigned and which can accordingly by imaged on more than one normalized primitive or terminal. If in step 415 it is found there is no following terminal in the case of the current primitive, then the actor routine reaches its end position 417 and the method returns to step 305 of the parsing routine.

Figure 5:
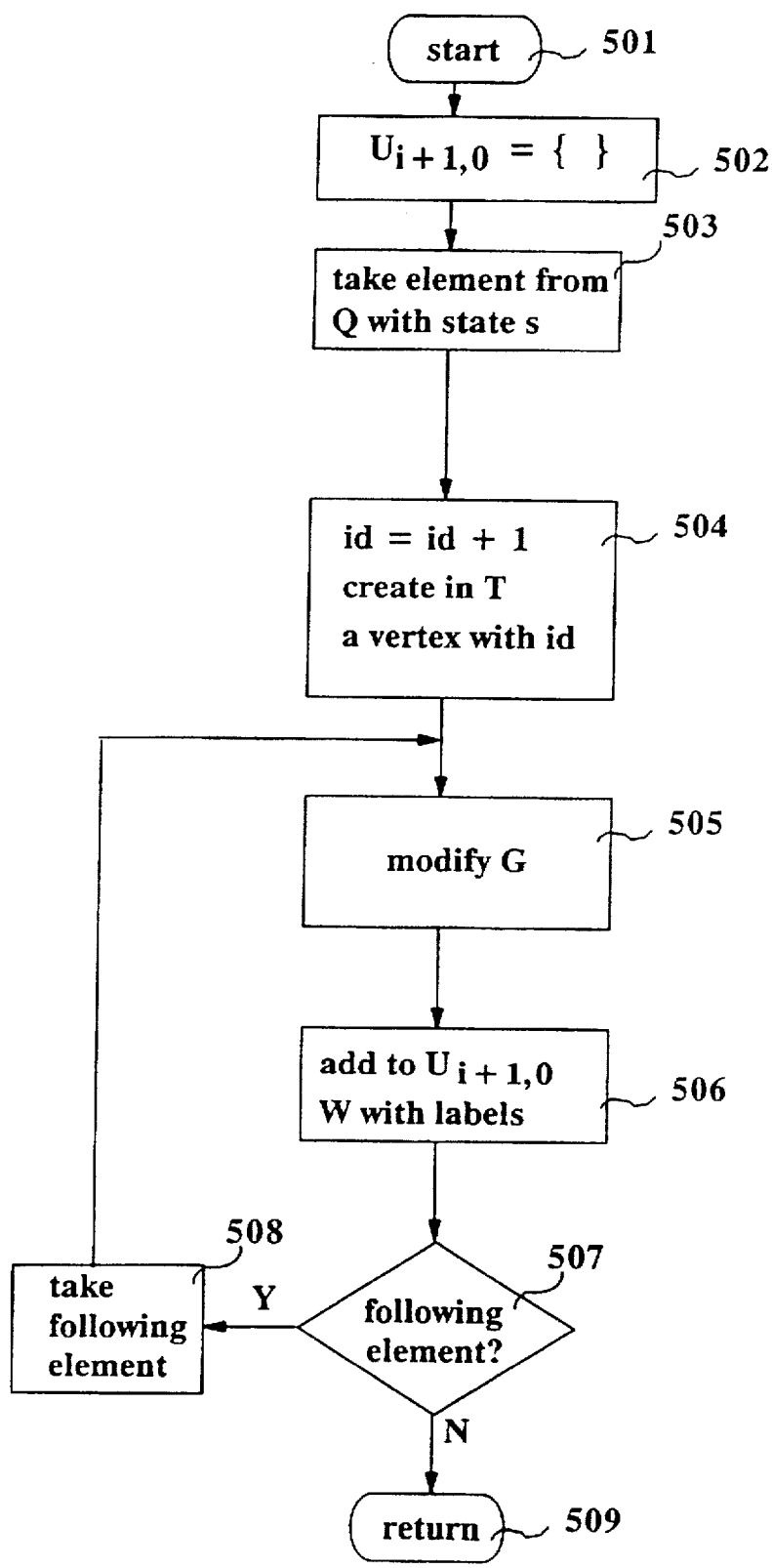
FIG. 5 is a flow diagram of a shift routine.

FIG. 5 shows an embodiment of the shift routine. Starting from the starting position 501, the set Ui+1,0 is initially set to the empty set in step 502. An element is then taken from Q in step 503. This element has a state which will hereinafter be designated s. In step 504 the counter id is then increased by 1 and a vertex with identifier id is added to the analysis tree T. Two vertices w and x are then added in step 505 to the graph-structured stack G on the basis of the element selected from set Q in step 503, vertex w having the label s and vertex x having the label id, an edge from w to x and an edge from x to the vertex, which is referred in the element selected from the set Q. In step 506 w provided with the label s is then added to set Ui+1,0. In step 507 a check is then made whether Q still has a following element. If so (Y), this element is selected in step 508 and, on the basis thereof, the steps 505 and 506 are then performed. If step 507 shows that no following element is present (N), the shift routine reaches the end position 509 and the method returns to step 311 of the parsing routine.

Figure 6:
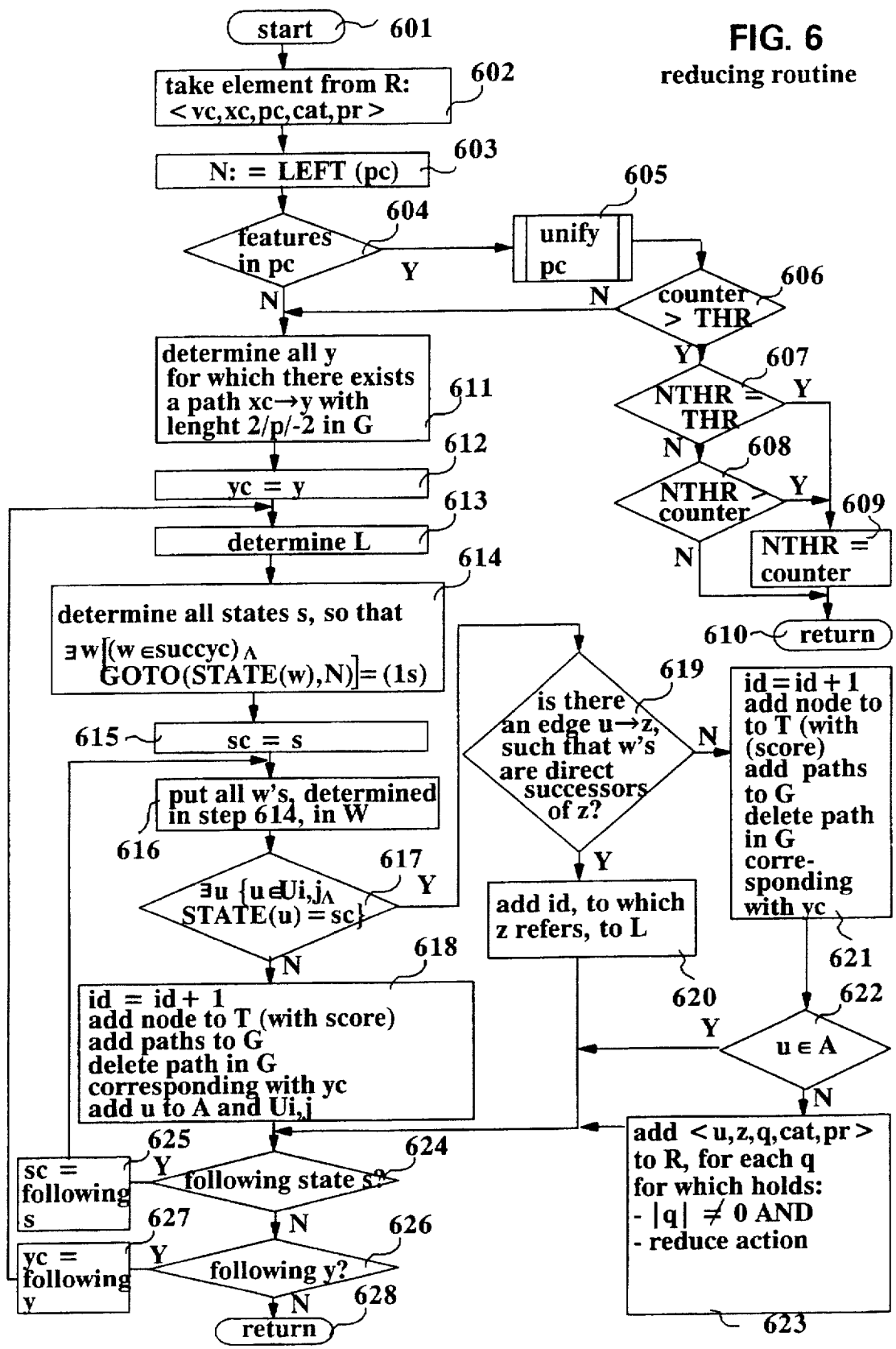
FIG. 6 is a flow diagram of a reducing routine.

FIG. 6 shows an embodiment of the reducing routine according to the invention. Starting from the starting position 601, an element is taken from the set R in step 602. The left-hand part of the rule, which is referred by the element determined in step 602, is then assigned to the variable N in step 603. A check is then made in step 604 whether the referred rule contains features. This is done by reference to a feature table stored in the memory and derived from the grammar. If this is the case (Y), the unification routine is invoked in step 605. After performing the unification routine, in which a violation counter is updated, a check is made in step 606 whether the violation counter exceeds the threshold value threshold. If so (Y), a check is made in step 607 whether the variables threshold and new-threshold are equal. If so (Y), the value of the violation counter is assigned to the variable new-threshold in step 609, whereupon end position 610 is reached. If that is not the case (N), a check is made in step 608 whether the variable new-threshold exceeds the violation counter. If that is the case (Y), step 609 is also performed whereupon end position 610 is reached. If it is found in step 608 that the variable new-threshold does not exceed the violation counter (N), end position 610 of the reducing routine is then reached directly. On reaching the end position 610 of the reducing routine, the method returns to step 307 of the parsing routine. Since nothing really has been reduced, the parsing routine will also reach its end position 315, the value zero being assigned to the variable result since the set Ui,j is empty. This leads to the thresholds being raised in the main routine and the parsing routine is again invoked. If it is found in step 604 that the rule contains no features (N) or if step 606 shows that the violation counter does not exceed the variable threshold, the reducing routine is continued by performing step 611. Step 611 determines all the nodes in the graph-structured stack G for which there is a path from xc to y of length 2|p|–2, where |p| is the number of terms of the right-hand part of rule p. A first y is then taken in step 612 and assigned to the variable yc. In step 613 a vector L is then determined by taking the id's associated with the terms from the right-hand part of the rule for reduction. Step 614 then determines all the states s for which there is a node w in G such that w is a direct successor of yc and for which the state s can also be found in the entry of a goto table, such entry being determined by the state associated with w and the term agreeing with the left-hand part of the current rule. The goto table is stored in the memory and is derived from the grammar. A first state s is then taken and assigned to the variable sc in step 615. In step 616 a set W is then created having as elements all the nodes w determined in step 614. A check is then made in step 617 whether the set Ui,j contains an element u having the state sc. If so (Y), step 619 checks whether there is already an edge from u to z in the graph-structured stack G, such that elements from W are direct successors of z. If that is the case (Y), the id to which z refers is then added to the vector L in step 620. If the condition posed in step 619 is not satisfied (N), step 621 is carried out. In step 621 the counter id is increased by 1, a node provided with the violation counter determined in step 605 and provided with references to directly successive nodes is added to the analysis tree T, two nodes, a node u with label sc and a node z with label id, are added to G, and an edge from u to z and edges from z to all the nodes w which are stated in W. Step 622 then checks whether u with label sc is mentioned in set A. If not (N), step 623 is performed, in which an element <u,z,q, category, primitive> is added to the set R for each q for which the present rule does not have an empty right-hand part and for which a reducing action is specified in the entry of the action table for the state associated with u and the terminal associated with the category. If this is the case (Y), the method continues by performing step 624. This is also carried out after performing step 620 and after performing step 623.

If the conditions posed in step 617 are not satisfied (N), step 618 is performed. In step 618 the counter id is increased by 1, a node provided with the violation counter determined in step 605 and provided with references to directly successive nodes is added to the analysis tree T, two nodes, a node u with label sc and a node z with label id, are added to G and also an edge from u to z and edges from z to all the nodes w which are mentioned in W; u is also added to A and Ui,j.

The method is then continued by performing step 624 in which a check is made whether there is a following state s in step 614. If that is the case (Y), this state is assigned to sc in step 625 and the method proceeds by performing step 616. If it is not so (N), step 626 checks whether there is a following y determined in step 611. If so (Y), step 627 assigns this following y to yc and the method continues by performing step 613. If this is not the case (N), the reducing routine reaches end position 628 and the method returns to step 307 of the parsing routine.

Figure 7:
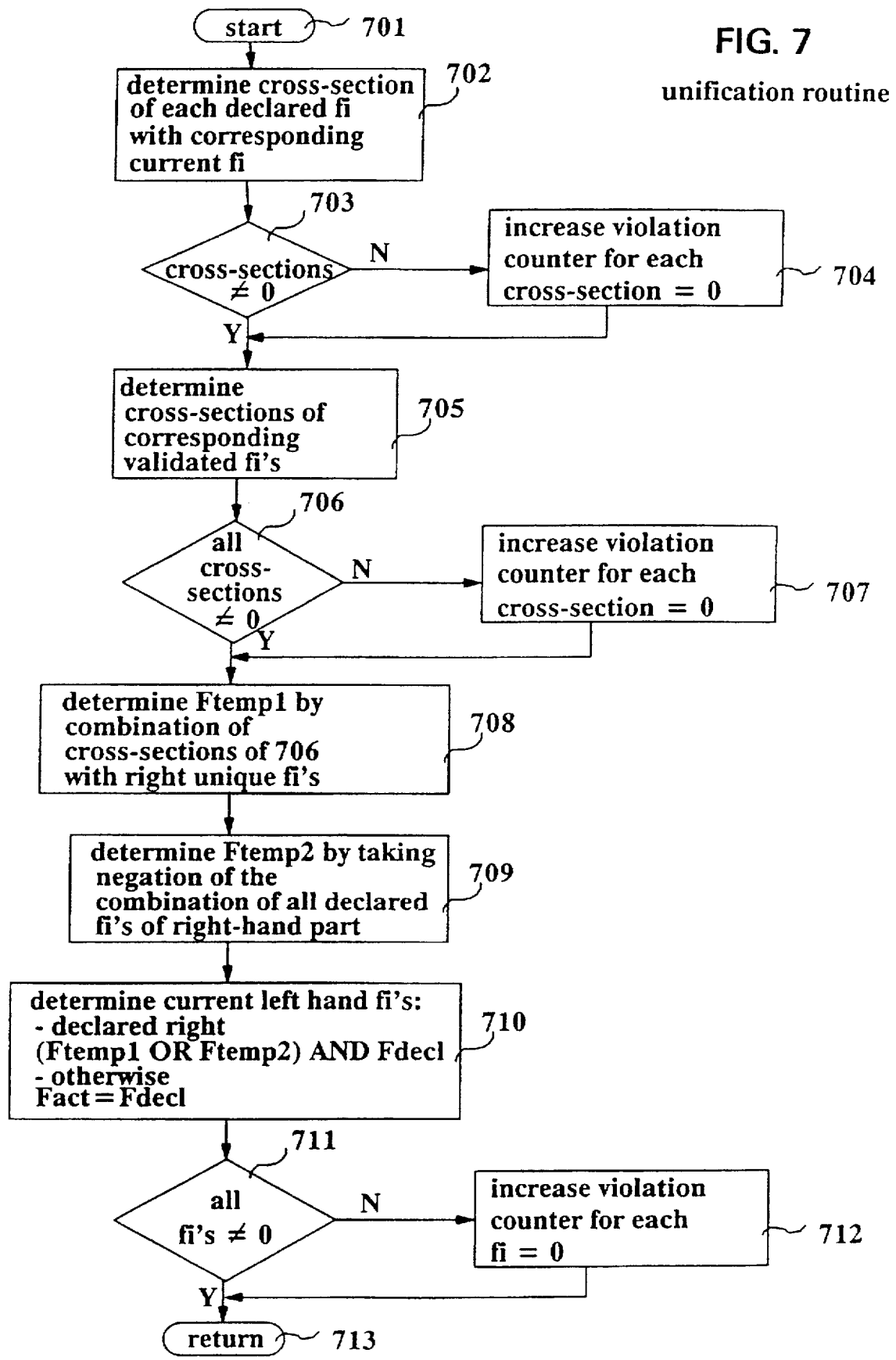
FIG. 7 is a flow diagram of a unification routine.

FIG. 7 shows an embodiment of the unification routine according to the invention. This routine is invoked in step 605 of the reducing routine. The routine can be invoked similarly by the e-reducing routine (step 309 of the parsing routine), but this is not developed further here. The unification routine uses feature tables stored in the memory and derived from the grammar. Binary coded feature groups will hereinafter be referred to as "feature indicators".

Starting from the starting position 701, step 702 determines validated feature indicators by determining, for each declared feature indicator of the right-hand part, the logic cross-section of the latter feature indicator with the corresponding current feature indicator. Step 703 then checks whether each validated feature indicator obtained in the preceding step is unequal to zero. If that is not the case (N), then that indicates that there are features absent from the supplied string of primitives, terminals and features. In that case, step 704 is performed, in which the violation counter is increased by a certain number if a validated feature indicator is equal to zero. This number may depend on the feature concerned, which delivers a weighted violation counter. Step 705 is then carried out after this step and also if step 703 shows that all the validated feature indicators are unequal to zero. In step 705, for each group of identical declared feature indicators present in the right-hand part, a unified feature indicator is determined by taking the cross-section of all the corresponding validated feature indicators. Step 706 then checks whether all the unified feature indicators obtained are unequal to zero. If that is not the case (N), then that indicates that there is no mutual agreement between the features in the input string, although the rules do require this. In that case, the violation counter is increased in step 707 by a certain number for each unified feature indicator equal to zero. In this case too, it is possible to use weighted numbers. After step 707 and also if step 706 shows that all the unified feature indicators obtained are unequal to zero (Y), step 708 is carried out. Step 708 determines a feature indicator Ftemp1 by determining the combination of all the feature indicators obtained in step 706 together with validated feature indicators corresponding to declared feature indicators occurring once on the right. Step 709 then determines a feature indicator Ftemp2 by taking the negation of the combination of all the declared feature indicators of the right-hand part. Step 710 then determines a current feature indicator for each feature indicator declared in the left-hand part. If the feature indicator declared on the left is also declared in the right-hand part, the corresponding current feature indicator is determined by sectioning the combination of Ftemp1 and Ftemp2 with the declared feature indicator. If the feature indicator declared on the left is not declared in the right-hand part, the current feature indicator is obtained by taking over the value of the declared feature indicator. Step 711 then checks whether all the feature indicators obtained in step 710 are unequal to zero. If that is not the case (N), that indicates that features cannot be passed on in accordance with the rules. In that case, in step 712 the violation counter is increased for each obtained current feature indicator equal to zero. The unification routine then reaches end position 713. If step 711 shows that all the feature indicators obtained are unequal to zero (Y), then end position 713 is directly reached, the method returning to step 605 of the reducing routine.

It is to be noted that the unification mechanism according to the invention, from which in the fore-going a possible implementation has been given, is applicable also in a parser as such, the parser not being necessarily restricted to a GLR-parser.

EXAMPLES

The versatility of the method and apparatus will now be explained by reference to a number of examples.

In a first example, the method and apparatus are used for character recognition. It is assumed that an optical signal S is obtained by scanning an image-carrying medium line by line by means of a scanning device. Signal S is converted to an electrical signal by a photoelectric converter, contained in the conversion unit 101 of FIG. 1. This signal is thresholded and stored in the form of a pixel pattern in a page buffer. This pixel pattern is then read out and converted to a stream of primitives P and a stream L of normalized primitives provided with feature groups.

Figure 8:
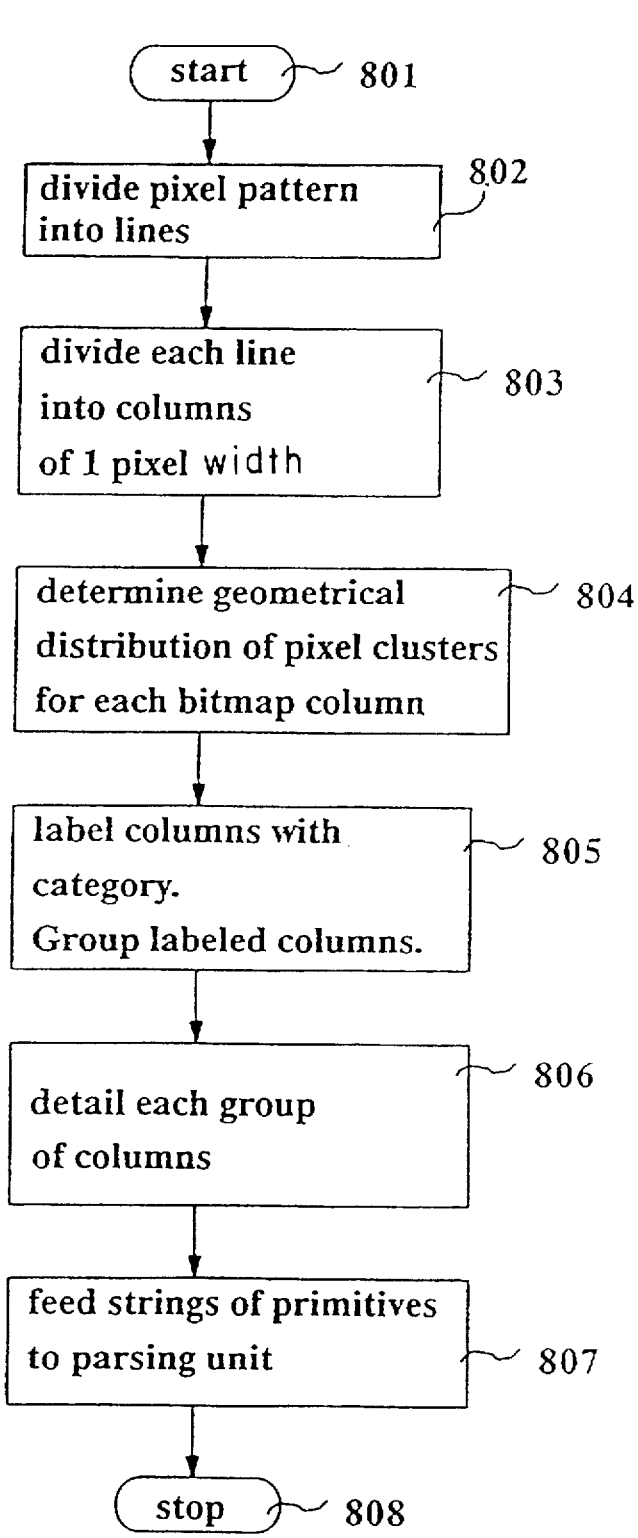
FIG. 8 is a flow diagram of a method for converting a pixel pattern into a string of primitives.

One possible advantageous embodiment of a method to be performed for converting such a pixel pattern into a series of primitives and lexicalizing these primitives is shown in FIG. 8.

Starting from the starting position 801, the pixel pattern fed to the converter is divided into lines in step 802. In step 803 each line is then divided into a number of bit map columns, each one pixel wide. Each bit map column will comprise zero or more pixel clusters. Step 804 then determines the number of pixel clusters, their length and their position for each bit map column. In step 805 the bit map columns are then labelled with a category on the basis of the data obtained in the preceding step, and adjoining columns of the same category are combined. It is advantageous at the same time to remove columns which cannot be combined, unless the columns are those in which there are no pixel clusters. In step 806, each resulting column, hereinafter referred to as a primitive, is then assigned a normalized primitive which is a prototype of a category, on the basis of the category with which the primitive is labelled. Also, each column is specified in greater detail on the basis of the geometry of the pixel clusters contained by each primitive, by assigning features which features are also included in the grammar. In step 807 the normalized primitive provided with features, the features being combined to form feature groups which are then binary coded, are then combined into strings and the strings are fed successively to the parsing unit, whereupon the end position 808 is reached. It is to be noted that the described method for the conversion of a pixel pattern into a series of primitives is applicable in general and is not restricted to the use with the combination described in this application.

A suitable choice of normalized primitives and features, together with the grammar, contributes very greatly to successful performance of the method. A suitable choice of this kind is shown in FIGS. 9a–9b. Six categories of primitives are distinguished, corresponding to the following normalized primitives indicated in FIG. 9a: blank, vertical bar, horizontal bar, double, triple and endmark. The features assigned to a primitive are determined by the geometric configuration of the pixel clusters contained by the primitive. In assigning the features, use is made of an imaginary bodyline and baseline (see FIG. 9c). Finally, a word space is imaged on the terminal endmark, and this concludes the string to be fed to the parser unit. It is to be noted that the application of the categories and corresponding normalized primitives described above is not restricted to the combination described in this application, but that such categories and normalized primitives are applicable more widely.

One example of a simple grammar suitable for processing a number of the terminals and features shown in FIGS. 9a–9b is given in Table 1. The present grammar is suitable for the recognition of the characters "a", "h" and "n" and can also determine whether these characters are normal or bold (weight: normal or bold). The grammar indicated has the property that it is not separate characters that are delivered, but whole words. In connection with a discussion of the correction mechanism hereinafter it will be shown that this is of particular advantage. It is to be noted that the delivery by the parser of complete words and not of separate characters is not restricted to the configuration described here, but that this is also applicable as such.

TABLE 1

Ftrs = CENTER HIGH-CENTER BOLD NORMAL VIOL LONG-UP LONG-DOWN
Weight = BOLD NORMAL
0 Character(Weight) :a(Weight).
1 Character(Weight) :h(Weight).
2 Character(Weight) :n(Weight).
3 Characters(Weight) :Character(Weight).
4 Characters(Weight) :Characters(Weight),Character(Weight).
5 START :WORD.
6 WORD :Characters(Weight),*endmark.
7a(Weight)   :*double(CENTER),*triple(CENTER),*vbar(CENTER,Weight),*blank.
8 h(Weight)  :*vbar(LONG-UP,Weight),*hbar(HIGH-CENTER),*vbar(CENTER,Weight),*blank.
9 n(Weight)  :*vbar(CENTER,Weight),*hbar(HIGH-CENTER),*vbar(CENTER,Weight),*blank.

Seven features are defined in this grammar. The feature groups associated with the terms of the grammar are indicated in parentheses after the corresponding term. One feature group is defined explicitly, the feature groups which contain only one feature are defined implicitly as such. The grammar is stored in the memory in the form of the action table, goto table and feature table which are shown in Tables 2, 3 and 4 respectively.

TABLE 2

| State | $ | *blank | *double | *end-mark | *hbar | *triple | *vbar | @ALL |
|---|---|---|---|---|---|---|---|---|
| 0 |   |   | sh7 |   |   |   | sh8 |   |
| 1 | acc |   |   |   |   |   |   |   |
| 2 |   |   | sh7 | sh10 |   |   | sh8 |   |
| 3 |   |   |   |   |   |   |   | re3 |
| 4 |   |   |   |   |   |   |   | re0 |
| 5 |   |   |   |   |   |   |   | re1 |
| 6 |   |   |   |   |   |   |   | re2 |
| 7 |   |   |   |   |   | sh11 |   |   |
| 8 |   |   |   |   | sh12 |   |   |   |
| 9 |   |   |   |   |   |   |   | re4 |
| 10 |   |   |   |   |   |   |   | re6 |
| 11 |   |   |   |   | sh13 |   |   |   |
| 12 |   |   |   |   | sh14 |   |   |   |
| 13 |   | sh15 |   |   |   |   |   |   |
| 14 |   | sh16 |   |   |   |   |   |   |
| 15 |   |   |   |   |   |   |   | re7 |
| 16 |   |   |   |   |   |   |   | re8/re9 |

TABLE 3

| State | Character | Characters | WORD | a | h | n |
|---|---|---|---|---|---|---|
| 0 | 3 | 2 | 1 | 4 | 5 | 6 |
| 1 |   |   |   |   |   |   |
| 2 | 9 |   |   | 4 | 5 | 6 |

TABLE 4

0  ((0011000) (001100))
1  ((0011000) (001100))
2  ((0011000) (001100))
3  ((0011000) (001100))
4  ((0011000) (001100) (0011000))
5  (( ) ( ))
6  (( ) (0011000) ( ))
7  ((0011000) (1000000) (1000000) (1000000 , 0011000) ( ))

TABLE 4-continued 8  ((0011000) (0000010 , 0011000) (0100000) (1000000 , 0011000) ( ))
9  ((0011000) (1000000 , 0011000) (0100000) (1000000 , 0011000) ( ))

In Table 4, the lines correspond directly to the rules from the grammar shown in Table 1. A pair of parentheses corresponds to a term from a grammatical rule. Between a pair of parentheses there are zero, one or more binary-coded feature groups associated with the corresponding term. The way in which features defined in the grammar are converted to binary-coded feature groups will be discussed later.

In the example of the method which will now be developed in detail, it is assumed that the conversion unit feeds to the parsing unit the following string of normalized primitives provided with current feature groups:

double (CENTER) triple (CENTER) vbar (CENTER, BOLD) bl vbar (CENTER, BOLD) hbar (HIGH-CENTER) vbar (CENTER, BOLD) bl endmark The corresponding string of primitives is shown in FIG. 9d. For the sake of clarity, the feature groups are not shown in binary coded form. In the discussion of the unification routine the binary coding will be used.

After initialization of the variables "result", "threshold", "delta-threshold", "new-threshold" in step 202 (FIG. 2), the string delivered by the lexicalizing unit is read in and terminated by an end symbol $ in step 203.

result=0
threshold=0
delta-threshold=0
new-threshold=0

The parsing routine is then invoked in step 205. Starting from the starting position 301 (FIG. 3), the counters, i, id, the violation counter, the graph-structured stack G and the tree T are initialized in step 302 and the element v0 is added to the set U0,0 id=0
violation counter=0
G=0
T=0
U0,0={v0}

A terminal and features associated with the first primitive ai are also read in in step 302.

Current primitive a0,
Current terminal and features: double (CENTER)

Counter j is then initialized in step 303 to 0, the sets R, Re and Q are initialized to the empty set and the set A is made equal to U0,0:

j=0
R=Re=Q={ }
A={v0}

A check is then made in step 304 whether A is an empty set. This is not the case (N) so that the actor routine is invoked.

The actor routine is developed in FIG. 4. Starting from the starting position 401, an element is removed from A in step 402 and this element becomes the current node vc. In step 403 the action table is then read for the terminal "double" and state 0. The action table, which is derived from the grammar, is shown in Table 2. This delivers the action "shift 7". In step 405 a check is made whether the action is "accept". This is not the case (N), so that step 407 checks whether the action is "shift s". This is the case, so that in step 408 <v0,7,double,a0> is added as an element to the set Q.

Q=Q{<v0,7,double,a0>}

Step 413 then checks whether a following action occurs in the entry determined in step 403. This is not the case (N), whereafter a check is then made in step 415 whether a following terminal has been assigned to the current primitive. This is not the case (N), so that the actor routine reaches the end position 417 and the method returns to step 305 of the parsing routine. Now that step 305 (FIG. 3) has been processed the method continues with step 310. Here a check is made whether the sets A, R and Re are all empty. This is the case (Y), so that step 311 calls up the shift routine.

The shift routine is shown in detail in FIG. 5. Starting from the starting position 501, in step 502 the set U1,0 is initialized to the empty set.

U1,0={ }

In step 503 a state is then taken from a tulle of Q.

s=7 from element <v0,7,double,a0>

In step 504 the counter id is then increased by 1 and in T a node is created with the label id and provided with the lexical data associated with ai.

id=1

T: 1 0 (*double [CENTER] a0)

In step 505 the following are then added to G: a node w with label s=7, a node x with label id=1, an edge from w to x and an edge from x to v0.

G: v0←x1←w7

In step 506 w with label s is then added to the set U1,0.

U1,0={w7}

In step 507 a check is made whether are still more elements present in Q. This is not the case (N) so that the method returns to the parsing routine and continues here with step 312 (FIG. 3) in which the counter i is increased by 1.

i=1

Step 313 then checks whether U1,0 is empty. This is not the case (N) so that step 316 checks whether there is a following primitive present. This is the case (Y), so that in step 318 this is read in with terminal and features.

current primitive: a1 current terminal and features: (*triple [CENTER])

Then j, A, R, Re and Q are initialized in step 303.

j=0

A=U1,0={w7}

R=Re=Q={ }ps Step 304 then checks whether the set A is empty. This is not the case (N) , A of course contains the element w7 so that the actor routine is called up in step 305.

Starting from the starting position 401 (FIG. 4), this element is taken from A in step 402 and it becomes the current node vc.

A={ } vc=w7

In step 403, the entry of the action table associated with the current terminal and the state associated with vc are then determined and the first action is read out from this. This yields shift 11. Step 405 then checks whether the action is "accept". This is not the case (N), so that step 407 checks whether the action is a shift action. That is the case, s having the value 11. The tulle <w7,11,triple,a1> is then added to Q in step 408.

s=11

Q={<w7,11,triple,a1>}

A check is then made in step 413 whether there is another following action in the entry determined in step 403. This is not the case (N), so that a check is then made in step 415 whether a following terminal has been assigned to the current primitive. This is not the case (N), so that the actor routine reaches the end position 417 and the method returns to step 305 (FIG. 3) of the parsing routine.

Proceeding from here, step 310 checks whether the sets A, R and Re are empty. This is the case (Y), so that the shift routine is called up in step 311.

Starting from the starting position 501 (FIG. 5), step 502 initializes the set U2,0 to the empty set.

U2,0={ }

Step 504 then takes a state from a tulle of Q.

s=11 from tulle <w7,11,triple,a1>

In step 504 id is then increased by 1 and a node is added to T.

id = 2
T:  1 0 (*double [CENTER] a0)
    2 0 (*triple [CENTER] a1)

The following are then added to G in step 505: a node w with label s=11, a node x with label id=2, an edge from w to x and an edge from x to w7.

G: v0←x1←w7←x2←w11

In step 506 w with label s is then added to set U2,0.

U2,0={w11}

Step 507 checks whether there are more elements present in Q. This is not the case (N), so that the method returns to the parsing routine.

The method is continued with step 312 in which the counter i is increased by 1.

i=2

Step 313 then checks whether the set U2,0 is empty. This is not the case (N), so that step 316 checks whether there is a following primitive present. This is the case (Y), so that this is read in with terminal and features in step 318.

Current primitive: a2

Current terminal and features: (*vbar[CENTER BOLD])

Then in step 303 j, A, R, Re and Q are initialized.

j=0

A=U2,0={w11}

R=Re=Q={ }

Step 304 then checks whether the set A is empty. This is not the case (N), so that the actor routine is called up in step 305.

Starting from the starting position 401, an element is taken from A in step 402: vc=w11. In step 403 the entry is determined in the action table associated with the current terminal (i.e. vbar) and the state of vc (i.e. 11), whereupon a first action present here is read in. This yields the action "shift 13". Step 405 then checks whether the action is "accept". This is not the case (N), whereupon step 407 checks whether the action is "shift s". This is the case so that in step 408 the tulle <w11,13,vbar,a2> is added as element to set Q:

Q={<w11,13,vbar,a2>}

Step 413 then checks whether there is a following action in the entry determined in step 403. This is not the case (N), whereupon step 415 then checks whether a following terminal has been assigned to the current primitive. This is not the case (N), so that the actor routine reaches the end position 417 and the method returns to step 305 of the parsing routine.

Proceeding from this, step 310 checks whether the sets A, R and Re are empty. This is the case (Y), so that the shift routine is called up in step 311.

17

Starting from the starting position 501, the set U3.0 is initialized to the empty set in step 502.

U3.0={ }

In step 503 an s associated with an element is taken from Q:

s=13 from element <w11,13,vbar,a2>

Step 504 then increases id by 1 and a node is added to T:

```
id = 3
T:  1  0  (*double   [CENTER]      a0)
    2  0  (*triple   [CENTER]      a1)
    3  0  (*vbar     [CENTER,BOLD] a2)
```

Step 505 then adds the following to G: a node w with label s=13, a node x with label id=3, an edge from w to x and an edge from x to w11.

G: v0←x1←w7←x2←w11←x3←w13

In step 506 w with label s is then added to the set U3.0

U3.0={w13}

Step 507 checks whether there are more tuples present in Q. This is not the case (N), so that the method returns to the parsing routine.

In the parsing routine the method is continued with step 312 in which the counter i is increased by 1.

i=3

Step 313 then checks whether the set U2.0 is empty. This is not the case (N), so that step 316 checks whether a following primitive is present. This is the case (Y), so that in step 318 this is read in with terminal and features.

current primitive: a3 current terminal and features: (*blank)

In step 303 j, A, R, Re and Q are then initialized.

j=0

A=U3.0={w13}

R=Re=Q={ }

Step 304 then checks whether the set A is empty. This is not the case (N), so that the actor routine is called up in step 305.

Starting from the starting position 401, an element is taken from A in step 402: vc=w13. In step 403 the entry is then determined in the action table associated with the current terminal (i.e. blank) and the state of vc (i.e. 13), whereupon a first action present here is read in. This yields the action "shift 15". Step 405 then checks whether the action is "accept". This is not the case (N), whereupon step 407 checks whether the action is "shift s". This is the case so that in step 408 the tulle <w13,15,*blank,a3> is added as element to set Q:

Q={<w13,15,*blank,a3>}

Step 413 then checks whether there is a following action in the entry determined in step 403. This is not the case (N), whereupon step 415 checks whether a following category has been assigned to the current primitive. This is not the case (N), so that the actor routine reaches the end position 417 and the method returns to step 305 of the parsing routine.

Proceeding from this, step 310 checks whether the sets A, R and Re are empty. This is the case (Y), so that the shift routine is called up in step 311.

Starting from the starting position 501, the set U4.0 is initialized to the empty set in step 502.

U4.0={ }

In step 503 a state is taken from Q:

s=15 from tulle <w13,15,blank,a3>

18

Step 504 then increases id by 1 and a node is added to T:

```
id = 4
T:  1  0  (*double   [CENTER]      a0)
    2  0  (*triple   [CENTER]      a1)
    3  0  (*vbar     [CENTER,BOLD] a2)
    4  0  (*blank                  a3)
```

Step 505 then adds the following to G: a node w with label s=15, a node x with label id=4, an edge from w to x and an edge from x to w13.

G: v0←x1←w7←x2←w11←x3←w13←x4←w15

In step 506 w with label s is then added to the set U4.0

U4.0={w15}

Step 507 checks whether there are more elements present in Q. This is not the case (N), so that the method returns to the parsing routine.

The method is continued with step 312 in which the counter i is increased by 1.

i=4

Step 313 then checks whether the set U2.0 is empty. This is not the case (N), so that step 316 checks whether a following primitive is present. This is the case (Y), so that in step 318 this is read in with terminal and features.

current primitive: a4 current terminal and features: (*vbar) [CENTER BOLD]

In step 303 j, A, R, Re and Q are then initialized.

j=0

A=U4.0={w15}

R=Re=Q={ }

Step 304 then checks whether the set A is empty. This is not the case (N), so that the actor routine is called up in step 205.

Starting from the starting position 401, an element is taken from A in step 402: vc=w15. In step 403 the entry is then determined in the action table associated with the category of the current word (i.e. vbar) and the state of vc (i.e. 15), whereafter a first action present here is read in. This yields the action "reduce 7". Step 405 then checks whether the action is "accept". This is not the case (N), so that step 407 checks whether the action is "shift s". This is also not the case (N), so that step 409 checks whether the action is "reduce p". This is actually the case (Y). Step 410 then checks whether rule 7 is a production rule with an empty right-hand part. This is not the case (N), whereafter in step 412 for each direct successor x of vc in G there is added to the set R an element of the form <vc,x,p,category,ai>.

R=R{<w15,x4,7,vbar,a4>}

Step 413 then checks whether there is a following action in the entry determined in step 403. This is not the case (N), whereupon step 415 checks whether a following terminal has been assigned to the current primitive. This is not the case (N), so that the actor routine reaches the end position 317 and the method returns to step 307 of the parsing routine.

Starting from step 307, step 310 then determines whether the sets A, R and Re are empty. This is not the case (N), since R is not empty. Step 307 is then reached via the steps 304 and 306. The reducing routine is invoked in step 307.

Starting from the starting position 601, an element is taken from R and read in in step 602. In step 603 the left-hand part of rule 7 is then assigned to the variable N.

N=a(Weight)

Step 604 then checks whether there are features declared in rule 7. This is the case (Y), so that the unification routine is invoked in step 605.

Proceeding from the starting position 701, step 702 determines validated feature indicators by determining for each declared feature indicator on the right the cross-section with the corresponding current feature indicator. The associated declared feature indicators are read by the unification routine from rule 7 of the feature table shown in table 4. The current feature indicators are shown in binary form here to illustrate the method.

| a(Weight): | *double(CENTER), | *triple(CENTER), | *vbar(CENTER, Weight), | *blank. |
|---|---|---|---|---|
| Fdecl | 0011000 | 1000000 | 1000000 | 1000000,0011000 |
| Fact |  | 1000000 | 1000000 | 1000000,0010000 |
| Fvalidated |  | 1000000 | 1000000 | 1000000,0010000 |

Step 703 then checks whether the cross-sections obtained are all not empty. This is the case (Y), so that there is no violation found in respect of the absence of features. In step 705, a unified feature indicator is then S determined for each feature group declared more than once in the right-hand part, by determining the cross-section of all the validated feature indicators belonging to that group. In the present case there are two groups, namely the group "CENTER" and the group "Weight", and it should be noted that the group "CENTER" contains only one feature. In the right-hand part there are three feature indicators belonging to the group "CENTER" and there is one feature indicator which belongs to the group "Weight". This yields Funified(CENTER)=1000000. Step 706 then checks whether the unified feature indicators obtained in the preceding step are not empty. This is the case (Y), so that no violation regarding conformity between the feature indicators is found. The method is then continued with step 708. In step 708 Ftemp1 is determined by performing a logic OR operation on all the unified feature indicators obtained in the preceding step together with unique validated feature indicators present in the right-hand part. This yields Ftemp1=FCENTER OR FWeight= 1010000. Step 709 is then carried out in which the feature indicator Ftemp2 is determined by taking the negation of the combination of all the declared features from the right-hand part.

Ftemp2=NON (1000000 OR 0011000)=0100111

Step 710 then determines current feature indicators for the left-hand part. Current feature indicators belonging to a group also declared in the right-hand part are determined from:

F(Group)act = (Ftemp1 OR Ftemp2) AND F(Group)decl
F(Weight)act = (1010000 OR 0100111) AND 0011000
            = 1110111 AND 0011000 = 0010000

Step 711 then checks whether all the current feature indicators obtained for the left-hand term are not empty. This is the case (Y), so that no violations are found in respect of the transmission of features. End position 713 is then reached and the method returns to step 505 of the reducing routine.

The method continues with performing step 606, in which a check is made whether the violation counter has a score exceeding the variable THRESHOLD. This is not the case (N), so that step 611 is performed. In step 611 those y's are determined for which there is in G a path of length 2*4–2 from xc (i.e. x4) to y. This yields y=x1. A first y is then taken in step 612 and assigned to the variable yc.

yc=x1.

Step 613 then determines L by taking the id's belonging to the terms from the right-hand part of the reduced rule.

L=(1,2,3,4)

In 614 all the states s are determined for which there is a w such that w is a direct successor of yc and also such that the state s is found in the entry of the goto table which is determined by the state belonging to w and the term corresponding to the left-hand part of the present rule. Consulting G shows that there is a direct successor of yc, i.e. v0. The accompanying state is s=0. Consulting the goto table for state s=0 (state associated with w) and the term 'a' yields s=4. This state is made the current state sc in step 615.

sc=4

Step 616 then assigns w=v0 as an element to the set W.

W={v0}

Step 617 then checks whether there is a u for which u is an element of the set U4,0 and the state associated with u is equal to sc. This is not the case (N) so that step 618 is performed. In step 618 id is increased by 1 and in T a node is created with a label id, the left-hand term with features and a pointer L to other id's, determined in step 613.

```
id = 5
T:  1 0  (*double          [CENTER] a0)
    2 0  (*triple          [CENTER] a1)
    3 0  (*vbar            [CENTER,BOLD] a2)
    4 0  (*blank           a3)
    5 0  (a        [BOLD]  (1,2,3,4) )
```

In step 618 there is also removed from G the path as determined in step 611 for yc and there is added to G a node u with label sc=4, a node z with label id=5, an edge from u to z, edges from z to w, for all w in W and u with label sc=4 is added to the sets A and U4,0.

G: v0<-z5<-u4

A={u4}

U4,0={w15 u4}

Step 624 then checks whether more states s were found in step 614. This is not the case (N), so that the routine proceeds to step 626, where a check is made whether step 611 found more y's. This is also not the case (N), so that end position 628 is reached in which the method returns to step 307 of the parsing routine.

Proceeding from step 307, step 310 is reached in which a check is made whether the sets A, R and Re are empty. A is not empty (N), so that the check in step 304 (N) is followed by step 305.

The actor routine is called up in this step. Proceeding from the starting position 401 an element is removed from A and this is made the current node vc.

A={ } vc=u4

Step 403 then determines the entry for the terminal associated with the current primitive (i.e. *vbar [CENTER;BOLD]) and for the state associated with vc (i.e. 4) and a first specified action is read in from this. This yields the action "reduce 0". In step 405 a check is then made whether the action is "accept". This is not the case (N), whereupon step 407 checks whether the action is "shift s". This is also not the case (N), so that step 409 checks whether the action is "reduce p". This is actually the case (Y). A check is then made whether rule 0 is a production rule with an empty right-hand part. This is not the case (N), whereafter step 412 adds an element of the form <vc,x,p,cat,ai> to the set R for each direct successor x of vc in G.

R=R{<u4,z5,0,*vbar,a4>}

Step 413 then checks whether there is a following action in the entry determined in step 403. This is not the case (N), whereupon step 415 checks whether a following terminal has been assigned to the current primitive. This is not the case (N), so that the actor routine reaches the end position 417 and the method returns to step 307 of the parsing routine.

Starting from step 307, step 310 then determines whether the sets A, R and Re are empty. This is not the case (N), since R is not empty. Step 307 is then reached via steps 304 and 306. The reducing routine is invoked in step 307.

Starting from the starting position 601, an element is taken from R and read in in step 602. In step 603 the left-hand part of rule 0 is then assigned to the variable N.

N=Character(Weight)

Step 604 then checks whether there are features declared in rule 0. This is the case (Y), so that the unification routine is called up in step 605.

Proceeding from the starting position 701, step 702 determines validated feature indicators by determining for each declared feature indicator on the right the cross-section with the corresponding current feature indicator.

|  | Character(Weight) | :a(Weight). |
|---|---|---|
| Fdecl | 0011000 | 0011000 |
| Fact |  | 0010000 |
| Fvalidated |  | 0010000 |

Step 703 then checks whether the cross-sections obtained are all not empty. This is the case (Y), so that there is no violation found in respect of the absence of features. In step 705, a unified feature indicator is determined for each feature group declared more than once in the right-hand part, by determining the cross-section of all the validated feature indicators belonging to that group. In the present case they are not present. Step 706 then checks whether the unified feature indicators obtained in the preceding step are not empty. In the absence of such feature indicators this question is answered in the affirmative so that no violation regarding conformity between the feature indicators is found. The method is then continued with step 708. In step 708 Ftemp1 is determined by performing a logic OR operation on all the unified feature indicators obtained in the preceding step together with unique validated-feature indicators present in the right-hand part. This yields Ftemp1=FWeight=0010000. Step 709 is then carried out in which the feature indicator Ftemp2 is determined by taking the negation of the combination of all the declared features from the right-hand part.

Ftemp2=NON (0011000)=1100111

Step 710 then determines current feature indicators for the left-hand part. Current feature indicators belonging to a group also declared in the right-hand part are determined from:

F(Group)act = (Ftemp1 OR Ftemp2) AND F(Group)decl

-continued

F(Weight)act = (0010000 OR 1100111) AND 0011000
            = 1110111 AND 0011000 = 0010000

Step 711 then checks whether all the current feature indicators obtained for the left-hand term are not empty. This is the case (Y), so that no violations are found in respect of the passing of features. End position 713 is then reached and the method returns to step 605 of the reducing routine. The method continues by performing step 606, in which a check is made whether the violation counter has a score exceeding the variable THRESHOLD. This is not the case (N), so that step 611 is performed. In step 611 those y's are determined for which there is in G a path of length 2*1-2 from xc (i.e. z5) to y. This yields y=z5. A first y is then taken in step 612 and assigned to the variable yc.

yc=z5.

Step 613 then determines L by taking the id's belonging to the terms from the right-hand part of the reduced rule.

L=(5)

In 614 all the states s are determined for which there is a w such that w is a direct successor of yc and also such that the state s is found in the entry of the goto table which is determined by the state belonging to w and the term corresponding to the left-hand part of the present rule. Consulting G shows that there is a direct successor of yc, i.e. v0. The accompanying state is s=0. Consulting the goto table for state s=0 (state associated with w) and the term "Character" yields s=3. This state is made the current state sc in step 615.

sc=3

Step 616 then assigns w=v0 as an element to the set W.

W={v0}

Step 617 then checks whether there is a u for which u is an element of the set U4,0 and the state associated with u is equal to sc. This is not the case (N), so that step 618 is performed. In step 618 id is increased by 1 and in T a node is created with a label id, the left-hand term with features and a pointer L to other id's, determined in step 613.

id = 6
T:  1  0  (*double      [CENTER]     a0)
    2  0  (*triple      [CENTER]     a1)
    3  0  (*vbar        [CENTER,BOLD] a2)
    4  0  (*blank                    a3)
    5  0  (a            [BOLD]       (1,2,3,4) )
    6  0  (Character    [BOLD]       (5) )

In step 618 there is also removed from G the path as determined in step 611 for yc and there is added to G a node u with label sc=3, a node z with label id=6, an edge from u to z, edges from z to w, for all w in W and u with label sc=3 is added to the sets A and U4,0.

G: v0←z6←u3
A={u3}
U4,0={w15 u4 u3}

Step 624 then checks whether more states s were found in step 614. This is not the case (N), so that the routine proceeds to step 626, where a check is made whether step 611 found more y's. This is also not the case (N), so that end position 628 is reached in which the method returns to step 307 of the parsing routine.

Proceeding from step 307, step 310 is reached in which a check is made whether the sets A, R and Re are empty. A is not empty (N), so that the check in step 304 (N) is followed by step 305.

23

The actor routine is invoked in this step. Proceeding from the starting position 401 an element is removed from A and this is made the current node.

A={ }
vc=u3

Step 403 then determines the entry for the terminal associated with the current primitive (i.e.*vbar[CENTER, BOLD]) and for the state associated with vc (i.e.3) and a first specified action is read in from this. This yields the action "reduce 3". In step 405 a check is then made whether the action is "accept". This is not the case (N), whereupon step 407 checks whether the action is "shift s". This is also not the case (N), so that step 409 checks whether the action is "reduce p". This is actually the case (Y). A check is then made in step 410 whether rule 3 is a production rule with an empty right-hand part. This is not the case (N), whereafter step 412 adds an element of the form <vc,x,p,cat,ai> to the set R for each direct successor x of vc in G.

R={<u3,z6,3,vbar,a4>}

Step 413 then checks whether there is a following action in the entry determined in step 403. This is not the case (N), whereupon step 415 checks whether a following terminal has been assigned to the current primitive. This is not the case (N), so that the actor routine reaches the end position 417 and the method returns to step 305 of the parsing routine.

Starting from step 305, step 310 then determines whether the sets A, R and Re are empty. This is not the case (N), since R is not empty. Step 307 is then reached via the steps 304 and 306. The reducing routine is invoked in step 307. Starting from the starting position 601, an element is taken from R and read in in step 602. In step 603 the left-hand part of rule 7 is then assigned to the variable N.

N=Characters(Weight)

Step 604 then checks whether there are features declared in rule 7. This is the case (Y), so that the unification routine is called up in step 605. Proceeding from the starting position 701, step 702 determines validated feature indicators by determining for each declared feature indicator on the right the cross-section with the corresponding current feature indicator.

|          | Character(Weight) | :Character(Weight). |
|----------|-------------------|---------------------|
| Fdecl    | 0011000           | 0011000             |
| Fact     |                   | 0010000             |
| Fvalidated |                 | 0010000             |

Step 703 then checks whether the cross-sections obtained are all not empty. This is the case (Y), so that there is no violation found in respect of the absence of features. In step 705, a unified feature indicator is determined for each feature group declared more than once in the right-hand part, by determining the cross-section of all the validated feature indicators belonging to that group. In the present case these are not present. Step 706 then checks whether the unified feature indicators obtained in the preceding step are not empty. In the absence of these feature indicators this is the case (Y), so that no violation regarding conformity between the feature indicators is found. The method is then continued with step 708. In step 708 Ftemp1 is determined by performing a logic OR operation on all the unified feature indicators obtained in the preceding step together with unique validated feature indicators present in the right-hand part. This yields Ftemp1=0010000. Step 709 is then carried out in which the feature indicator Ftemp2 is determined by taking the negation of the combination of all the declared features from the right-hand part.

Ftemp2=NON (0011000)=1100111

Step 710 then determines current feature indicators for the left-hand part. Current feature indicators belonging to a group also declared in the right-hand part are determined from:

$$F(Group)act = (Ftemp1 \text{ OR } Ftemp2) \text{ AND } F(Group)decl$$
$$F(Weight)act = (0010000 \text{ OR } 1100111) \text{ AND } 0011000$$
$$= 1110111 \text{ AND } 0011000 = 0010000$$

Step 711 then checks whether all the current feature indicators obtained for the left-hand term are not-empty. This is the case (Y), so that no violations are found in respect of the passing of features. End position 713 is then reached and the method returns to step 505 of the reducing routine.

The method continues with performance of step 606, in which a check is made whether the violation counter has a score which exceeds the variable THRESHOLD. This is not the case (N) so that steps 611–616 are performed. This yields:

y=z6
L=6
s=2 where w=v0
W={v0 }

Step 617 checks whether there is an element of U4,0 whose state is equal to 2. This is not the case (N), whereupon the steps 618, 624 (N), 626 (N) yield the following:

id = 7
T:  1  0  (*double       [CENTER] a0)
    2  0  (*triple       [CENTER] a1)
    3  0  (*vbar         [CENTER,BOLD] a2)
    4  0  (*blank        a3)
    5  0  (a             [BOLD] (1,2,3,4))
    6  0  (Character     [BOLD] (5))
    7  0  (Characters    [BOLD] (6))

G: v0←z7←u2
A={u2 }
U4,0={w15 u4 u3 u2}

End position 628 is then reached, whereupon the method returns to step 307 of the parsing routine.

Proceeding from step 307, step 310 is reached where a check is made whether the sets A, R and Re are empty. A is not empty (N), so that step 305 is performed after the check in step 304 (N).

The actor routine is invoked in this step. Proceeding from the starting position 401, an element is removed from A and this element becomes the current node vc.

A={ }
vc=u2

In step 403 the entry is determined for the terminal associated with the current primitive (i.e. *vbar[CENTER, BOLD]) and for the state associated with vc (i.e.3) and a first specified action is read in from this. This yields the action "shift 8". After performance of steps 405 (N) and 407 (Y), step 408 is carried out. The element <u2,8,*vbar,a4> is added to Q.

Q={<u2,8,*vbar,a4>}

After step 413 (N) and step 415 (N) end position 417 is reached and the method returns to step 305 of the parsing routine.

Checking in step 310 shows that the sets A, R and Re are empty (Y), so that step 311 is performed.

The shift routine is invoked in step 311. The result of the shift routine in this situation is that a new node is added to T and two new nodes to G:

```
id = 7 + 1 = 8
T:  1  0  (*double      [CENTER] a0)
    2  0  (*triple      [CENTER] a1)
    3  0  (*vbar        [CENTER,BOLD] a2)
    4  0  (*blank       a3)
    5  0  (a            [BOLD] (1,2,3,4) )
    6  0  (Character    [BOLD] (5) )
    7  0  (Characters   [BOLD] (6) )
    8  0  (*vbar        [CENTER,BOLD] a4)
```

The method is now continued by reading in a following primitive. The subsequent steps have in principle already been discussed so that we shall now simply give T as finally delivered by the parsing routine.

```
T:   1   0 (*double [CENTER] a0)
     2   0 (*triple [CENTER] a1)
     3   0 (*vbar [CENTER BOLD] a2)
     4   0 (*blank [ ] a3)
     5   0 (a [BOLD] ((1 2 3 4))
     6   0 (Character [BOLD] ((5))
     7   0 (Characters [BOLD] ((6))
     8   0 (*vbar [CENTER BOLD] a4)
     9   0 (*hbar [HIGH_CENTER] a5)
    10   0 (*vbar [CENTER BOLD] a6)
    11   0 (*blank [ ] a7)
    12   0 (n [BOLD] (8 9 10 11 ))
    13   0 (Character [BOLD] (12 ))
    14   0 (Characters [BOLD] (7 13 ))
    15   0 (*endmark [ ] a8)
    16   0 (WORD (14 15 ))
```

On reaching end position 315, this analysis obtained is written away in the form of a parentheses structure. The id associated with the root of the analysis found is assigned to the variable result and this yields:

```
result = 16
16 -> 0 (WORD []

0 (Characters [BOLD ]

0 (Characters [BOLD]

(0 Character [BOLD ]

(0 a [BOLD ]

(0 *double [CENTER ] a0)

(0 *triple [CENTER ] a1)

(0 *vbar [CENTER BOLD ] a2)

(0 *blank [] a3) ) ) )
  (0 Character [BOLD ]

(0 n [BOLD ]

(0 *vbar [CENTER BOLD ] a4)

(0 *hbar [HIGH_H CENTER ] a5)

(0 *vbar [CENTER BOLD ] a6)

(0 *blank [] a7) ) ) )

(*endmark [] a8))
```

On termination of the parsing routine, the method returns to step 207 which checks whether the parsing routine has delivered a result unequal to zero. This is the case (Y), so that step 211 then checks whether the number of violations is equal to zero. This is also the case (Y), so that the method stops in step 214.

The method has now analyzed a supplied signal by reference to a grammar and not found any violations.

Processing can now continue with the original signal or with the analysis delivered by the parsing unit. In the current case the recognized characters were aimed at so these will therefore be used for further processing.

If step 211 shows that the number of violations of the resulting solutions is unequal to zero (N), the correction unit 104 in FIG. 1 is invoked in step 212.The method of this, suitable for the present field of application of the apparatus, i.e. optical character recognition, comprises the following steps in one advantageous embodiment. In a first step, the words obtained for each group of primitives supplied to the parsing unit are sorted as to violation score. A check is first made whether the word with the lowest violation score occurs in an electronic lexical vocabulary. If not, this word is rejected and a following word is taken. If only one word is delivered and if this word is not contained in the associated vocabulary, a spelling corrector is invoked which generates a number of variants of the word which are checked successively by reference to the vocabulary. If the word is found in the electronic vocabulary then the word, together with the lexical data associated with the word, is placed in a sentence buffer. If the word is found but there is an indication that the inflection is incorrect, this word is marked and placed in a buffer. If the sentence buffer contains a complete sentence, a grammar checker is invoked, a check being made for correct inflections and, if necessary, a inflection corrector is invoked as described in Netherlands application NL-A9101286. The complete sentence is then delivered. In this way use is made of the knowledge of the linguistic domain for the purposes of character recognition.

With reference to the method of converting a pixel pattern into strings of terminals and features to be supplied in groups to the parsing unit, as shown in FIG. 8, it should be noted that it is advantageous to assign several categories to a pixel column in step 805, resulting in several terminals associated with a primitive. As a result, decisions as to the choice of a category can be postponed to a later phase of the recognition process. This variant is possible because the parsing unit is capable of processing ambiguous input.

Figure 10:
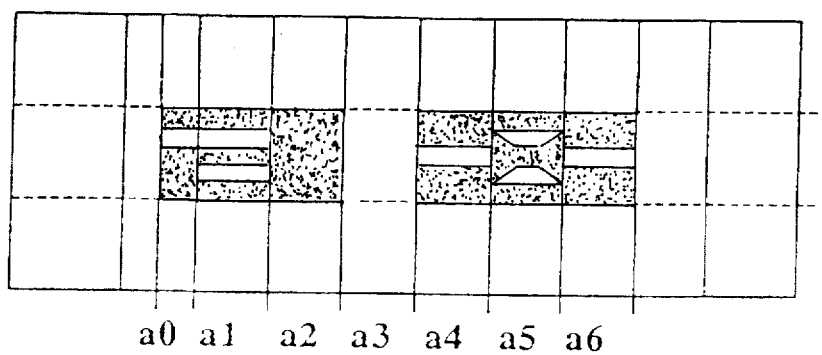
FIG. 10 shows a string of primitives.

It is also advantageous to assign mutually exclusive features to a primitive in step 806. The use of this has the effect that a choice for one or other feature need not be made at the time of assigning features, a time when no further data for assigning the features are known other than simply the geometry of the pixel clusters, and this choice can be postponed to a later phase. Both possibilities are acceptable, so that it is only in a later phase, e.g. on the basis of the number of violations or on the basis of the linguistic check, that the correct choice can be made. This variant is possible as a result of the way in which the parsing unit processes the features. A similar situation is explained by reference to FIG. 10 which illustrates a number of primitives. With regard to the fifth primitive it is difficult to determine whether it has the descending or ascending feature. Since the middle pixel cluster cannot clearly be put under "ascending" or "descending", if both mutually exclusive features are now assigned to the terminal associated with this primitive, the decision as to whether an "s" or "z" is involved can be put off to a later phase. Assuming that the parsing unit yields two analyses "as" and "az", both with the same number of violations, then a correction procedure, checking whether the recognized words occur in an electronic vocabulary, yields the word "as" as being the correct word. It is to be noted that the ability to assign mutual exclusive features to a primitive and the subsequent processing of these is not restricted to the combination described in this application, but that this is also applicable as such.

With reference to the grammar shown in Table 1, it should be noted that this grammar has the particular advantage that it is not separate characters that are delivered by the parsing unit, but words. In connection with the violation mechanism, the method is able to deliver a string of recognized words provided with a violation score for a given supplied series of primitives. It is advantageous that if one or more solutions are delivered by the parsing unit these solutions can be directly checked by linguistic aids. This is not possible when one character at a time is recognized. No linguistic rules are applicable to a single character. In such a case, which can of course be carried out with the present method by adapting the grammar, an extra step is necessary to combine the recognized characters into words.

A number of variants will now be discussed again with reference to the grammar shown in Table 1. In a first variant, it is not entire words but series of a fixed number (n) of characters which are delivered by the parsing unit, hereinafter referred to as n-grams. The correction mechanism in these circumstances consists of checking the delivered n-grams against a list of permissible n-grams. Table 5 gives a grammar yielding trigrams (n=3). A next variant consists out of letting overlap the subsequently delivered n-grams by taking care that subsequently fed series of normalized primitives overlap. It is to be noted that the delivery of n-grams, which do or do not overlap, by a pattern recognition unit is not restricted to the combination described in this application, but that this is also applicable as such.

TABLE 5

Ftrs = CENTER HIGH-CENTER BOLD NORMAL VIOL LONG-UP LONG-DOWN
Weight = BOLD NORMAL
Character(Weight) :a(Weight).
Character(Weight) :h(Weight).
Character(Weight) :n(Weight).
START :TRIGRAM.
TRIGRAM:Character(Weight),Character(Weight),Character(Weight),*endmark.
a (Weight)  :*double(CENTER),*triple(CENTER),*vbar(CENTER, Weight),*blank.
h(Weight)  :*vbar(LONG-UP,Weight),*hbar(HIGH-CENTER), *vbar(CENTER,Weight),*blank.
n(Weight)  :*vbar(CENTER,Weight),*hbar(HIGH-CENTER), *vbar(CENTER,Weight),*blank A following advantageous variant of the grammar comprises including in the grammar rules intended that adhering characters should nevertheless be recognized as separate characters. A variant of this kind is shown in Table 6. In this way it is possible, for example, for a c and an 1 to be delivered as solution in addition to a d. The correction mechanism can then make the correct choice.

TABLE 6

Ftrs = CENTER HIGH-CENTER BOLD NORMAL VIOL LONG-UP LONG-DOWN VIOL
Weight = BOLD NORMAL
Character(Weight) :a(Weight).
Character(Weight) :h(Weight).
Character(Weight) :n(Weight).
Characters(Weight) :Character(Weight).
Characters(Weight) :Characters(Weight),Character(Weight).
START :WORD.
WORD :Characters(Weight),*endmark.
a(Weight) :*double(CENTER),*triple(CENTER),*vbar(CENTER, Weight),blank.
blank :*blank.
blank :missing-blank(VIOL,VIOL,VIOL).
h(Weight)  :*vbar(LONG-UP,Weight),*hbar(HIGH-CENTER), *vbar(CENTER,Weight),blank.
missing-blank :.
n(Weight)  :*vbar(CENTER,Weight),*hbar(HIGH-CENTER), *vbar(CENTER,Weight),blank.

It is also possible to include in the grammar rules which process kerning of characters in a correct way. It will also be apparent that recognition and passing of fonts can readily be performed. Finally, Table 7 shows a variant of the grammar in which the character is indicated as a feature in the solution. It is to be noted that the use of such variants of the grammar is not restricted to the combination described in this application, but that such variants are also applicable as such.

TABLE 7

Ftrs = CENTER HIGH-CENTER BOLD NORMAL VIOL LONG-UP LONG-DOWN a h n
Weight = BOLD NORMAL
Character(Weight,a)  :*double(CENTER),*triple(CENTER), *vbar(CENTER,Weight),*blank.
Character(Weight,h)  :*vbar(LONG-UP,Weight),*hbar(HIGH-CENTER), *vbar(CENTER,Weight),*blank.
Character(Weight,n)  :*vbar(CENTER,Weight),*hbar(HIGH-CENTER), *vbar(CENTER,Weight),*blank.
Characters(Weight) :Character(Weight).
Characters(Weight) :Characters(Weight),Character(Weight)
START :WORD.
WORD :Characters(Weight),*endmark.

A variant of the apparatus according to the invention used for optical character recognition, advantageously using the violation score, is obtained by storing the bit maps of the characters which are recognized the best. This is possible by storing the bit map for each character recognized for a first time and then replacing the bit map in each case by the bit map of the same character if this is character is recognized with a lower violation score. It is then possible to reconstruct the original by means of bit maps of the recognized primitives which are best recognized. It is to be noted that the application of the additional measures described above is not restricted to the combination described in this application, but that the measures are also applicable as such.

In the following discussion of the second example the apparatus according to the invention is used for grammatical analysis of sentences. Grammatical analysis of sentences is advantageous in all those applications in which an original signal for recognition contains linguistic information. In a final step of such a process, in which words are delivered, it is possible, by a grammatical analysis, to verify the signal in detail and, if necessary correct it. The example relates to this latter step, for which an apparatus according to the invention is used. The grammar used is given in Table 8.

TABLE 8

Getal = SING1 SING2 SING3 PLU1 PLU2 PLU3
0 NP(Getal) :*article(Getal),*noun(Getal).
1 S :VP(Getal).
2 START :TOP.
3 TOP :S,*endmark.
4 VP(Getal) :NP(Getal),*verb(Getal).

In this example six features are defined: SING1 SING2 SING3 PLU1 PLU2 and PLU3. These features are combined to a group, the group Getal (=Number). The tables derived from the grammar and stored in the memory, and used by the method, i.e. the action, goto and feature table, are given in Tables 9, 10 and 11 respectively.

TABLE 9

Action Table

| State $ | *article | *endmark | *noun | *verb | @ALL |
|---|---|---|---|---|---|
| 0 |  | sh5 |  |  |  |
| 1 | acc |  |  |  |  |
| 2 |  |  | sh6 |  |  |
| 3 |  |  |  |  | re1 |
| 4 |  |  |  | sh7 |  |
| 5 |  |  | sh8 |  |  |
| 6 |  |  |  |  | re3 |
| 7 |  |  |  |  | re4 |
| 8 |  |  |  |  | re0 |

TABLE 10 goto-table

| State | NP | S | TOP | VP |
|---|---|---|---|---|
| 0 | 4 | 2 | 1 | 3 |
| 1 |  |  |  |  |
| 2 |  |  |  |  |
| 3 |  |  |  |  |
| 4 |  |  |  |  |
| 5 |  |  |  |  |

TABLE 10-continued goto-table

| State | NP | S | TOP | VP |
|---|---|---|---|---|
| 6 |  |  |  |  |
| 7 |  |  |  |  |
| 8 |  |  |  |  |

TABLE 11 feature-table

| 0 | ((111111) (111111) (111111)) |
| 1 | (( )     (111111)) |
| 2 | (( )     ( )) |
| 3 | (( )  ( )  ( )) |
| 4 | ((111111) (111111) (111111)) |

Let us assume that the sentence which has to be checked for linguistic accuracy is: "A man works".

This sentence forms the signal S fed to the conversion unit 101 in FIG. 1. The conversion unit converts the signal into a form suitable for processing by the parsing unit 102. For this purpose, the signal is first segmented into primitives. For this application, the words form the primitives so that the conversion unit segments the string of characters supplied into words. These words are then provided with normalized primitives (terminals) and features. The resulting lexicalized string is fed to the parsing unit 102.

a1 a (*article [SING3])

a2 man (*noun [SING3])

a3 works (*verb [SING3])

a4. (*endmark [])

The method of the parsing unit will now be described in detail for this example by reference to FIGS. 2–7. Starting from the starting position 201 (FIG. 2), a number of variables are initialized in step 202.

result=0 threshold=0 delta-threshold=0 new-threshold=0

The string is then read in in step 203 and a terminal symbol $ is added to the string. The parsing routine is then called up in step 204. The parsing routine is developed in detail in FIG. 3. Starting from the starting position 301 (FIG. 3), the counters i, id, the violation counter, the graph-structured stack G and the tree T are initialized in step 302 and the element v0 is added to the set U0.0 i=0 id=0 violation counter=0

G=0

T=0

U0.0={v0}

The first primitive a0 provided with lexical data is also read in from the string in this step.

current primitive a0 (*article [SING3])

Counter j is then initialized in step 303 to 0, the sets R, Re and Q are initialized to the empty set and the set A is made equal to U0.0:A={v0} j=0

R=Re=Q={ }

A={v0 }

A check is then made in step 304 whether A is an empty set. This is not the case (N) so that the actor routine is called up.

The actor routine is developed in FIG. 4. Starting from the starting position 401, an element is removed from A in step 402 and this element becomes the current node vc. In step 403 the entry in the action table is then determined associated with the terminal "*article" and state 0. The action table, which is derived from the grammar, is shown in Table 9. A first action from this entry is then read in in step 404. This yields the action "shift 5". In step 405 a check is made whether the action is "accept". This is not the case (N), so that step 407 checks whether the action is "shift s". This is the case, so that in step 408 <v0,5,*article,a0> is added as an element to the set Q.

Q=Q{<v0,5,*article,a0>}

Now that step 305 has been processed the method continues with step 310 (FIG. 3). Here a check is made whether the sets A, R and Re are all empty. This is the case (Y), so that step 311 calls up the shift routine.

The shift routine is shown in detail in FIG. 5. Starting from the starting position 501, in step 502 the set U1,0 is initially set to the empty set.

U1,0={ }

In step 503 a state is then taken from a tuple of Q.

s=5 from element <v0,5,*article,a0)

In step 504 the counter id is then increased by 1 and in T a node is created with id and provided with the lexical data associated with the zeroth primitive.

id=1

T: 1 0 (*article [SING3 PLU3] a0)

In step 505 the following are then added to G: a node w with label s=5, a node x with label id=1, an edge from w to x and an edge from x to v0.

G: v0←x1←w5

In step 506 w with label s is then added to the set U1,0.

U1,0={w5}

In step 507 a check is made whether are still more elements present in Q. This is not the case (N), so that the method returns to the parsing routine and continues here with step 312 in which the counter i is increased by 1.

i=1

Step 313 then checks whether U1,0 is empty. This is not the case (N), so that step 316 checks whether there is a following primitive present. This is the case(Y), so that in step 318 this is read in.

current primitive a1: (*noun [SING3] a1)

Then j, A, R, Re and Q are initialized in step 303.

j=0

A=U1,0={w5}

R=Re=Q={ }

Step 304 then checks whether the set A is empty. This is not the case (N). A of course contains the element w5 so that the actor routine is invoked in step 305.

Starting from the starting position 401, this element is taken from A in step 402 and made the current node vc.

A={ } vc=w5

In step 403, the entry of the action table associated with the current terminal and the state associated with vc are then determined and the first action is read out from this. This yields shift 8. Step 405 then checks whether the action is "accept". This is not the case (N), so that step 407 checks whether the action is a shift action. That is the case, s having the value 8. The element <w5,8,noun,a1> is then added to Q in step 408.

s=8

Q={<w5,8,noun,a1>}

A check is then made in step 413 whether there is another following action in the entry determined in step 403. This is not the case (N), so that a check is then made in step 415 whether a following terminal has been assigned to the current primitive. This is not the case (N), so that the actor routine reaches the end position 417 and the method returns to step 305 of the parsing routine.

Proceeding from here, step 310 checks whether the sets A, R and Re are empty. This is the case (Y), so that the shift routine is called up in step 311.

Starting from the starting position 501, step 502 initializes the set U2,0 to the empty set.

U2,0={ }

Step 503 then takes a state from a tuple of Q.

s=8 from element <w5,8,noun,a1>

Step 504 then increments id by 1 and a node is added to T:

id = 2

T:  1 0 (*article  [SING3 PLU3] a0)

2 0 (*noun    [SING3] a1)

The following are then added to G in step 505: a node w with label s=8, a node x with label id=2, an edge from w to x and an edge from x to w5.

G: v0←x1←w5←x2 w8

In step 506 w with label s is then added to set U2,0.

U2,0=U2,0 {w8 }

Step 507 checks whether there are more elements present in Q. This is not the case (N), so that the method returns to the parsing routine.

The method is continued with step 312 in which the counter i is increased by 1.

i=2

Step 313 then checks whether the set U2,0 is empty. This is not the case (N), so that step 316 checks whether there is a following primitive present. This is the case (Y), so that the method continues with step 317 in which the following primitive becomes the current primitive.

Current word: a2 (*verb [SING3] a2)

Then in step 303 j, A, R, Re and Q are initialized.

j=0

A=U2,0={w8}

R=Re=Q={ }

Step 304 then checks whether the set A is empty. This is not the case (N), so that the actor routine is invoked in step 305.

Starting from the starting position 401, an element is taken from A in step 402: vc=w8. In step 403 the entry is determined in the action table associated with the terminal of the current primitive (i.e. verb) and the state of vc (i.e. 8), whereupon a first action present here is read in. This yields the action "reduce 0". Step 405 then checks whether the action is "accept". This is not the case (N), whereupon step 407 checks whether the action is "shift s". This is also not the case, so that in step 409 a check is made whether the action is "reduce p". This is the case (Y). A check is then made whether rule 0 is a production rule with an empty right-hand part. This is not the case, so that in step 412 for each direct successor x of vc in G an element of the form <vc,x,p,cat,a2> is added to set R:

R=R {<w8,x2,0,verb,a2>}

Step 413 then checks whether there is a following action in the entry determined in step 403. This is not the case (N), so that the actor routine reaches the end position 415 and the method returns to step 307 of the parsing routine.

Proceeding from this, step 310 checks whether the sets A, R and Re are empty. This is not the case (N), since R is not empty. Step 307 is then reached via the steps 304 and 306. The reducing routine is called up in step 307. Starting from the starting position 601, an element is taken from R and read in in step 602. In step 603 the left-hand part of rule 0 is then assigned to the variable N.

N=NP(Getal)

Unification of the associated rule takes place in step 605.

Proceeding from the starting position 701, step 702 determines validated feature indicators by determining for each declared feature indicator on the right the cross-section with the corresponding current feature indicator.

|  | NP(Getal) : | *article(Getal), | *noun(Getal) |
|---|---|---|---|
| Fdecl | 111111 | 111111 | 111111 |
| Fact |  | 001000 | 001000 |
| Fvalidated |  | 001000 | 001000 |

Step 703 then checks whether the cross-sections obtained are all not empty. This is the case (Y), so that step 705 is carried out. In step 705, a unified feature indicator is determined for each feature group declared more than once in the right-hand part, by determining the cross-section of all the validated feature indicators belonging to that group. In the present case there is one group, namely the group "GETAL". This yields Unified (GETAL)=001000. Step 706 then checks whether the unified feature indicator obtained in the preceding step is not empty. This is the case (Y), so that no violation regarding conformity between the feature indicators is found. The method is then continued with step 708 in which Ftemp1 is determined by performing a logic OR operation on all the unified feature indicators obtained in the preceding step together with unique validated feature indicators present in the right-hand part. This yields Ftemp1=001000. Step 709 is then carried out in which the feature indicator Ftemp2 is determined by taking the negation of the combination of all the declared features from the right-hand part.

Ftemp2=000000

Step 710 then determines current feature indicators for the left-hand part.

F(Getal)act=(001000 OR 000000) AND 111111=001000

Step 711 then checks whether all the feature indicators obtained in step 710 are not-empty. This is the case(Y), so that no violations are found in respect of the passing of features. End position 713 is then reached and the method returns to step 605 of the reducing routine.

The method continues with performing step 606, in which a check is made whether the violation counter exceeds the variable threshold. This is not the case (N), so that step 611 is performed.

In step 611 those y's are determined for which there is in G a path of length 2*2–2 from xc (i.e. x2) to y. This yields y=x1. A first y is then taken in step 612 and assigned to the variable yc.

yc=x1.

Step 613 then determines L by taking the id's belonging to the terms from the right-hand part of the reduced rule.

L=(1,2)

In 614 all the states s are determined for which there is a w such that w is a direct successor of yc and also such that the state s is found in the entry of the goto table which is determined by the state belonging to w and the term corresponding to the left-hand part of the present rule. Consulting G shows that there is a direct successor of yc, i.e. v0. The accompanying state is s=0. Consulting the goto table for state s=0 (state associated with w) and the term NP yields s=4. This state is made the current state sc in step 614.

sc=4

Step 616 then assigns w=v0 as an element to the set w.

W={v0}

Step 617 then checks whether there is a u for which u is an element of the set U2,0 and the state associated with u is equal to sc. This is not the case (N), so that step 618 is performed. In step 618 id is incremented by 1 and in T a node is created with a label id, the left-hand term with features and a pointer L to other id's, determined in step 613.

id = 3
T:  1 0 (*article  [SING3 PLU3]  a0)
    2 0 (*noun     [SING3]       a1)
    3 0 (NP        [SING3]       (1,2) )

There is then removed from G the path as determined in step 611 for yc and there is added to G a node u with label sc=4, a node z with label id=3, an edge from u to z, edges from z to w, for all w in W and u with label sc=4 is added to the sets A and U2,0.

G: v0←z3←u4

A={u4}

U2,0={w8 u4}

Step 624 then checks whether more states s were found in step 614. This is not the case (N), so that the routine proceeds to step 626, where a check is made whether step 611 found more y's. This is also not the case (N), so that end position 628 is reached in which the method returns to step 307 of the parsing routine. Proceeding from step 307, step 310 is reached in which a check is made whether the sets A, R and Re are empty. A is not empty (N), so that the check in step 304 (N) is followed by step 305.

The actor routine is invoked in this step. Proceeding from the starting position 401 an element is removed from A and this is made the current node vc.

A={ } vc=u4

Step 403 then determines the entry for the terminal associated with the current word works (i.e. verb) and for the state associated with vc (i.e. 4), whereupon a first specified action is read in from this in step 404. This yields "shift 7". After steps 405 (N) and 407 (Y) have been performed, step 408 is carried out. The element <u4,7,*verb,a2> is added to Q.

Q={<u4,7,*verb,a2>}

After step 413 (N) and step 415 (N), end position 417 is reached and the method returns to step 305 of the parsing routine.

A check in step 310 shows that the sets A, R and Re are empty (Y) so that step 311 is performed.

The shift routine is called up in step 311. In this situation the result of the shift routine is that a new node is added to T and two new nodes are added to G:

id = 4

-continued

```
T:  1  0  (*article  [SING3 PLU3]  a0)
    2  0  (*noun    [SING3]        a1)
    3  0  (NP       [SING3]        (1,2) )
    4  0  (*verb    [SING3]        works)
```

G: v0←z3←u4←x4←w7
U3,0={w7}

After the shift routine, the counter i is incremented: i=3, in step 312. Step 313 then checks whether U3,0 is empty. This is not the case (N), whereupon step 316 checks whether there is a following primitive present. This is the case (Y), so that this following primitive is taken in step 318: "*endmark." In step 303 j is again initially set to zero, R. Re and Q are initialized to the empty set and A is initialized to U3,0 i.e.{w7}. Since A is not empty, the actor routine is called up in step 305. In the actor routine the action table is read for the primitive "." (*endmark) and state 7. This yields "reduce 4". In step 410 of the actor routine a check is made whether rule 4 is an empty production rule. This is not the case (N), so that step 412 is then carried out in which R is provided with the element <w7,x4,4,*endmark,a3>:

R={<w7,x4,4,*endmark,a3>}

Since no following actions are specified, the actor routine returns to the parsing routine. The reducing routine is then invoked in the parsing routine. In the reducing routine, the left-hand part of rule 4 is determined in step 603. This is "VP(GETAL)". Features are declared in this rule so that the unification routine is called up in step 605. Starting from the starting position 701, validated feature indicators on the right are determined in step 702

|            | VP(GETAL) : | *verb(GETAL), | NP(GETAL). |
|------------|-------------|---------------|------------|
| Fdecl      | 111111      | 111111        | 111111     |
| Fact       |             | 001000        | 001000     |
| Fvalidated |             | 001000        | 001000     |

These are not empty, a feature which is tested in step 704, so that the method continues with step 705. In this, for each feature group declared more than once in the right-hand part a unified feature indicator is determined by determining the cross-section of all the validated feature indicators which belong to that group. In the present case there is one group, namely the group "GETAL". This yields: Unified(GETAL) =001000. Step 706 then checks whether the unified feature indicator obtained in the preceding step is not empty. This is the case (Y), so that no violation is found regarding conformity between the feature indicators. Step 708 then determines Ftemp1, by performing a logic OR operation on all the unified feature indicators obtained in the preceding step, together with unique validated feature indicators present in the right-hand part. This yields Ftemp1=001000. Step 709 is then carried out in which the feature indicator Ftemp2 is determined by taking the negation of the combination of all the declared features of the right-hand part:

Ftemp2=000000

In step 710 current feature indicators are determined for the left-hand part:

F(Getal)act=(001000 OR 000000) AND 111111=001000

Step 711 then checks whether all the feature indicators obtained in 710 are non-empty. This really is the case (Y), so that no violations are found regarding the passing on of features. End position 713 is then reached and the method returns to step 605 of the reducing routine.

The method continues with performing step 606 which checks whether the violation counter exceeds the variable threshold. This is not the case (N), so that step 611 is carried out. In this step all the y's are determined for which there is a path in G from xc (=x4) to y of length 2|p|−2=2. This yields y=z3. Step 613 then determines the id's associated with the symbols from the right-hand part of the present rule. This gives L=(4,3). Steps 614–628 are then carried out in the way already described, giving the following result:

sc=GOTO(STATE(w),N)=GOTO(0,VP)=3
W={v0}
id=5 id = 5
```
T:  1  0  (*article  [SING3 PLU3]  a1)
    2  0  (*noun    [SING3]        a2)
    3  0  (NP       [SING3]        (1,2) )
    4  0  (*verb    [SING3]        a3)
    5  0  (VP       [SING3]        (4,3) )
```

G: v0←z5←u3
A={u3}
U3,0={u3}

The method then returns to the parsing routine, in which, since A is not empty, the actor routine in step 305 is then invoked.

In this, in step 403 the action table is consulted for the word "*endmark." and state 3. This yields "reduce 1", so that the set R becomes: R={<u3,z5,1,*endmark,a3>}. The method then returns to the parsing routine where, since R is not empty, the reducing routine is now invoked. In the reducing routine, the left-hand part is first determined for the associated rule for reducing. This is N=S. Step 604 then checks whether there are features declared in this rule. That is the case (Y), so that the unification routine is called up. Starting from the starting position 701, validated feature indicators are determined on the right in step 702

|        | S : VP(GETAL). |
|--------|----------------|
| Fdecl  | 111111         |
| Fact   | 001000         |
| Funi   | 001000         |

These are not empty, a feature which is tested in step 703, so that the method continues with step 705. Since there are not several feature indicators associated with the same group in the right-hand part, the steps 705 and 706 have no effect. Ftemp1 is determined in step 708. Ftemp1=001000. In step 709 Ftemp2 is determined: Ftemp2 =000000. In step 610 the current feature indicators are then determined for the left-hand part. No features have been declared on the left, so that no current features have to be determined for this and the steps 710 and 711 have no effect. End position 713 is then reached, in which the method returns to the reducing routine.

In this, step 604 checks whether the violation counter has exceeded the threshold. This is not the case, so that the routine proceeds with step 611. In this step all the y's are determined for which there is a path in G from xc (=z5) to y of length 2|p|−2=0. This yields y=z5. Step 613 then determines the id's associated with the symbols from the right-hand part of the present rule. This gives L=(5). Steps 513–529 are then carried out in the manner already described giving the following result:

sc=GOTO(STATE(w),N)=GOTO(STATE(V0),S)=2

W={v0}
id=6

```
id = 6
T:  1  0  (*article    [SING3 PLU3] a1)
    2  0  (*noun       [SING3] a2)
    3  0  (NP          [SING3] (1,2) )
    4  0  (*verb       [SING3] a3)
    5  0  (VP          [SING3] (4,3) )
    6  0  (S           (5) )
```

G: v0←z6←u2
A={u2}
U3.0={u2}

The method returns to the parsing routine, in which, since A is not empty, the actor routine is invoked in step 305.

In the actor routine the action table is consulted for the word "*endmark." and state 2. This yields "shift 6", so that Q={u2,6,*endmark,a3}. The method then returns from the actor routine to the parsing routine, in which the shift routine is invoked in step 311. In this, in step 502 U4.0 is first initialized to the empty set, whereupon the following steps 503–509 yield the following result:

```
id = 7
T:  1  0  (*article    [SING3 PLU3] a1)
    2  0  (*noun       [SING3] a2)
    3  0  (NP          [SING3] (1,2) )
    4  0  (*verb       [SING3] a3)
    5  0  (VP          [SING3] (4,3) )
    6  0  (S           (5) )
    7  0  (*endmark    a4 )
```

G: v0←z6←u2←x7←w6
U4.0={w6}

The method then returns to the parsing routine, in step 312 of which the counter i is increased by 1 to yield: i=4. Step 313 then checks whether U4.0 is empty. This is not the case (N), whereupon step 316 checks whether there is a primitive. The end symbol is still present (Y), so that the end symbol, $, is read in in step 318. A number of initializations then take place in step 303, inter alia A=U4.0={w6}. Since A is not empty, the actor routine is called up in step 305. After consultation of the action table in step 403 which yields reduce 3, in step 412 R becomes {<w6,x7,3,end symbol, a4>}, whereafter the method returns via step 417 to the parsing routine. In the latter, since R is not empty, the reducing routine is invoked in step 307. In step 603 of the reducing routine the left-hand part of the associated rule is determined: N=TOP. Further performance of the reducing routine finally yields:

```
id = 8
```

-continued
```
T:  1  0  (*article    [SING3 PLU3] a1)
    2  0  (*noun       [SING3] a2)
    3  0  (NP          [SING3] (1,2) )
    4  0  (*verb       [SING3] a3)
    5  0  (VP          [SING3] (4,3) )
    6  0  (S           (5) )
    7  0  (*endmark    a4 )
    8  0  (TOP         (6,7) )
```

G: v0←z6←u2←z8←u1
A={u1}
U4.0={u1}

The method returns to the parsing routine and then, after performing steps 310, 304, the actor routine is invoked up. In step 403 the action table is consulted for the end symbol "$" and state 1. This yields the action "accept" and the node u1 is also assigned to the variable r and id 8 to the variable result. The method returns to the parsing routine via steps 413 and 415. The shift routine is called up in step 311 in the parsing routine. Since, however, the set Q is empty, the shift routine has no effect and 313 is reached. Here a check is made whether U5.0 is empty. This is not the case, whereupon step 316 checks whether there is a primitive or an end symbol present. That is not the case (N). In step 317 the analyses obtained are then written away in the form of a parentheses structure, the id associated with the analysis found being assigned to the variable result. This yields the following (the primitives themselves being included for the sake of clarity):

result=8

```
8  →  (TOP
        (S
          (VP  [SING3]
            (NP  [SING3]
              (*article  [SING3 PLU3]  A)
              (*noun     [SING3]  man))
            (*verb  [SING3]  works))))
        (*endmark  .))
```

The parsing routine then reaches end position 315, whereupon after return to the method of the parsing unit step 205 is reached, in which a check is made whether the parsing routine has delivered a result unequal to zero. This is the case (Y), so that a check is then made in step 209 whether the number of violations is equal to zero. This is also the case (Y), so that the method stops in step 211.

The versatile and flexible properties of the parsing unit with regard to the violation mechanism will now be explained in detail with reference to a number of examples. The fact that these examples relate to the area of natural language processing has no limitive significance, but has been done because these examples are simple to understand.

In the following example it is assumed that the grammar according to Table 8 applies. Let us assume that the signal fed to the apparatus is segmented by the conversion unit 101 into the string of primitives reading: "A man work." Processing is then identical to the previous example in which the input string was "A man works.", as far as reducing rule 4 of the grammar. At that time the tree T has the following form (the primitive variables ai are replaced by the primitives themselves for the sake of clarity):

| T: | 1 0 (*article | [SING3 PLU3] A) |
|---|---|---|
|    | 2 0 (*noun   | [SING3] man)    |
|    | 3 0 (NP      | [SING3] (1,2) ) |
|    | 4 0 (*verb   | [SING3] work)   |

In the reduction of rule 4 of the grammar, in which a noun phrase (NP) and a verb are reduce to a verb phrase (VP), the numbers of the terms to be reduced do not agree. In that situation processing of the feature indicators is as follows:

|            | VP(Getal) | :NP(Getal), | *verb(Getal). |
|------------|-----------|-------------|---------------|
| Fdecl      | 111111    | 111111      | 111111        |
| Fact       |           | 001000      | 110111        |
| Fvalidated |           | 001000      | 110111        |

Determining the cross-section of the validated feature indicators belonging to the same group yields a violation, since this cross-section is empty:

Funif(Getal) 000000←+1

There is therefore a violation in respect of conformity between the features of terms from the right-hand part.

Determination of Ftemp1 yields: 000000

Determination of Ftemp2 yields: 000000

Determination of current feature indicators on the left yields:

Fact(Getal)=(000000 OR 000000) AND 111111= 000000←+1

A violation is now also found in respect of the passing of the features to the term of the left-hand part, so that on leaving the unifying routine the violation counter has the score 2.

If the method now again returns to the reducing routine, step 606 checks whether the violation score is greater than the variable threshold initially set to zero in step 202. This is the case (Y), whereupon step 607 checks whether the variable new-threshold also initialized to zero in step 202 is equal to the variable threshold. This is also the case (Y), whereupon in step 609 new-threshold is assigned the value 2. The reducing routine is not continued, the method returns to the parsing routine and proceeds with step 310. All the sets A, R and Re are empty (Y), so that in step 311 the shift routine is invoked. Set Q is also empty, since the actor routine has not been called up. Consequently, only Ui+1,0 is initialized to the empty set in the shift routine, whereupon end position 509 is directly reached. The method returns to the parsing routine, where i is then incremented in step 312. Step 313 then checks whether Ui,0 is empty. This is so (Y). In step 314 the value 0 is then assigned to the variable result, whereupon the parsing routine reaches the end position 315. The method returns to the main routine of the parsing unit, whereupon step 205 checks whether the variable result has a value unequal to zero. This is not the case (N), so that the method is continued by performing step 206. Step 206 checks whether the variable threshold has a value greater than a preset value MAX. Assuming that in the present situation MAX has the value twenty, this question must be answered in the negative (N). In step 208 the value of the variable threshold is then fixed at 2+1=3 and the value 3 is also assigned to the variable new-threshold. The parsing routine is then again called up in step 204. The parsing routine then again begins by initializing G and T inter alia, and reading in the first primitive. If the method again arrives at reducing rule 4 of the grammar, then unification again yields a score of 2 violations. However, step 606 of the reducing routine now shows that the score is not greater than the threshold (N), so that the method proceeds by performing steps 611–628 of the reducing routine. On addition of a node to T in step 618, the position of the violation counter is also indicated. This yields:

id = 5
| T: | 1 0 (*article | [SING3 PLU3] the) |
|---|---|---|
|    | 2 0 (*noun   | [SING3] man)      |
|    | 3 0 (NP      | [SING3] (1,2) )   |
|    | 4 0 (*verb   | [SING3] work)     |
|    | 5 2 (VP      | [SING3] (4,3) )   |

A = { u3 }
U3,0 = { u3 }

The method then returns to the parsing routine, where, since A is not empty, the actor routine is then called up in step 305.

The method is continued, reducing of rule 1 of the grammar again showing a violation because the current feature indicator Getal belonging to VP is zero. The score indicated by the violation counter thus becomes 3. However, the score is still not larger than the threshold, which is checked in step 606 (N), so that the method is continued. No further violations of the rules occur, so that the parsing routine finally yields the following analysis:

| T: | 1 0 (*article | [SING3 PLU3] the) |
|---|---|---|
|    | 2 0 (*noun    | [SING3] man)      |
|    | 3 0 (NP       | [SING3] (1,2) )   |
|    | 4 0 (*verb    | [SING3] works)    |
|    | 5 2 (VP       | [SING3] (4,3) )   |
|    | 6 3 (S        | (5) )             |
|    | 7 0 (*endmark | . )               |
|    | 8 3 (TOP      | (6,7) )           |

In step 317 T is written away in the form of a parentheses structure and the id belonging to the analysis found is assigned to the variable result. This yields:

result = 8
8 → (3 TOP []
     (3 S []
      (2 VP []
       (0 NP [SING3 ]
        (0 *article [SING3 PLU3 ] the)
        (0 *noun [SING3 ] man))
       (0 *verb [SING1 SING2 PLU1 PLU2 PLU3 ] work)))
     (0 *endmark [] .))

Step 205 of the main routine of the parsing unit then checks whether the variable result is unequal to zero.This is the case (Y), whereupon step 209 checks whether the violation score is equal to zero. This is not the case (N), so that the method is continued with step 210, in which a correction routine is carried out. In the present example relating to the processing of natural language, a correction routine of this kind may comprise an inflection corrector as described in application EP-A-0 052 469, combined with the parsing routine according to the present invention. Use can advantageously be made here of the yielded analysis, in which there is an indication of those reduction steps in which violations of the rules were found. The main routine of the parsing unit then reaches end position 211, whereupon the analyses obtained and the corrected signals are available for further processing.

This example shows that the apparatus is suitable for verifying signals by reference to a system of rules and then carrying out a correction action by reference to the analysis obtained.

Figure 11:
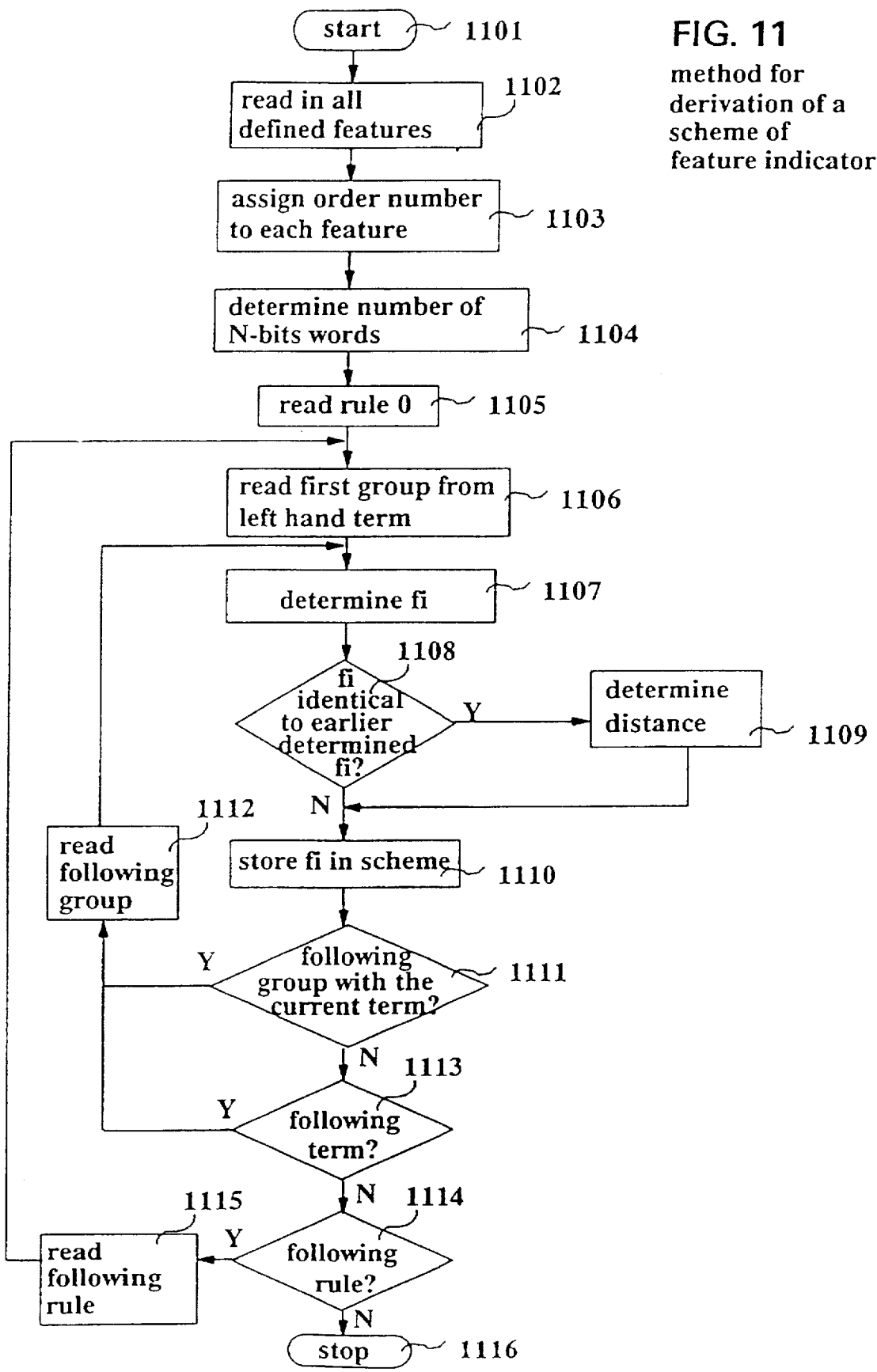
FIG. 11 is a flow diagram of a method of deriving a scheme of feature indicators.

Before a grammar, i.e. a system, of rules, really is suitable for use by the method, it is necessary to bring these rules into a form suitable for the method, such form comprising an action table, a goto table and a feature table, the latter being a scheme of feature indicators coupled to the rules. The procedure in making a parser suitable for processing specific signals is usually such that a grammar in the form of a number of rewriting rules in accordance with a certain grammar formalism is written and then the grammar is compiled, i.e. a number of tables suitable for automatic processing by a computer unit are derived from the grammar. Deriving an action table and a goto table from a grammar is known in the art. Deriving a feature table in accordance with the invention will now be explained in detail with reference to the method illustrated in FIG. 11. Starting from the starting position 1101, step 1102 reads in all the defined features from the grammar for processing. Each feature is then assigned an order number in step 1103. Step 1104 determines the number of N-bits words required for the feature indicators to be defined. This number is determined by the total number of defined features and by N. For an implementation programmed in the programming language C, and using the Unix operating system, N=32 is a suitable choice. The rule with number 0 is then read in in step 1105. The first group belonging to the left-hand term is then read in from the rule in step 1106. The feature indicator is then determined in step 1107. If this involves a group defined in the grammar, the features the group comprises are determined by reference to this definition. If a single feature directly indicated in the grammatical rule is involved, then the group indicated by the name of this one feature comprises just that one feature. In addition it is also permissible to define a group in a grammatical rule by adding or subtracting predefined groups and features. The feature indicator is then formed by replacing by a one in a string of zeroes of a length of the number of features each zero having an order number corresponding to an order number of a contained feature. The string obtained is then imaged on the number of N-bit words obtained in step 1104. Step 1108 then checks whether an identical feature indicator is already known in the right-hand part. If so (Y), the distance from this previously determined feature indicator is determined in step 1109. In step 1110 the data obtained are then written away in a suitable memory structure. Step 1111 then checks whether a following group is present in the current term. If so (Y), this group is read in in step 1112 and then the method proceeds with step 1107. If that is not the case (N), step 1113 checks whether the current rule has a following term. If there is a following term (Y), the method continues with step 1112. If there is no following term (N), step 1114 checks whether the grammar contains a following rule. If so (Y), this rule is read in in step 1115 and the method proceeds with step 1106. If this is not the case, the method reaches end position 1116. An example of a suitable memory structure reproduced as a parentheses structure in which the coded feature groups are grouped for each rewriting rule and are ordered in accordance with the rewriting rule, and in which a pointer is added to a preceding identical coded feature group belonging to the grammar of table 8, is shown in Table 11.

TABLE 11

((111111) (111111) (1 111111))
(( ) (111111))
(( ) ( ))
(( ) ( ) ( ))
((111111) (111111) (1 111111))

The order of the features is: SING1 SING2 SING3 PLU1 PLU2 PLU3. By providing the coded feature groups with pointers to identical groups within the same right-hand part, the determination of agreement within a group of identical declared features is accelerated. The distance determined in step 1109 is taken for the pointer.

The processing of features in accordance with the invention gives considerable advantages. The designer of a recognition system operating in accordance with the invention is thus enabled accurately to determine to what extent signals may deviate from the ideal signals and yet still be acceptable. This gives considerable advantage, particularly in situations in which the incoming signals are mutilated, e.g. due to inaccuracies of sensor means, in which the signals are very weak, or in which the signals intrinsically have considerable variation, as in the case of handwritten characters or speech signals.

The versatility and flexibility of a grammar written in accordance with a grammar formalism adapted in accordance with the invention insofar as concerns the introduction of features in rewriting rules, will be illustrated in detail by reference to some examples. The examples relate to the grammatical rules shown in Table 12. These rules, which are not mutually consistent, are intended solely to illustrate the versatility of the formal grammar adapted according to the invention. The application thereof is not restricted to natural language processing.

TABLE 12

Ftrs = SING1 SING2 SING3 PLU1 PLU2 PLU3 DUMMY
Getal = SING1 SING2 SING3 PLU1 PLU2 PLU3
Dum = DUMMY
0 S :NP(Getal), VP(SING1+SING2+SING3+PLU1+PLU2+PLU3)
1 NP(Getal) :*det(Getal), *noun(Getal+Dum).
2 NP(PLU3) :*noun(Getal).

Rule 0 shows that a feature group may be formed by adding up features. The group Getal is equal to the group defined at VP. This implies that a test is made for conformity between the corresponding current feature indicators on unification. If a test for conformity is to be avoided, it is possible, as illustrated in rule 1, to add a dummy feature to the group Getal. The group "Getal+Dum" is not equal to the group "Getal" and accordingly no conformity test is carried out. In rule 2, the feature "PLU3" is always assigned to NP. In this way it is possible to introduce features which no longer need to be associated with a terminal.

The present invention being thus described, it will be obvious that the same may be varied in many ways. Such variations are not to be regarded as a departure from the spirit and scope of the invention, and all such modifications as would be obvious to one skilled in the art are intended to be included within the scope of the is following claims.

We claim:

1. An apparatus for pattern recognition comprising:

a memory storing reference templates corresponding to all available alphanumeric characters;

identification means for identifying each group of pixels in an input stream as corresponding to one of the templates such that a recognized document is produced;

violation means, responsive to said identification means, for assigning a violation score to each identified group of pixels according to a degree of similarity between the identified group of pixels and the corresponding reference template; and comparison means for comparing, in a situation where at least two groups of pixels have been identified as corresponding to a given template, the violation scores of the at least two groups of pixels corresponding to the given template; and selection means for selecting, in said situation where said at least two groups of pixels have been identified as corresponding to said given template, one of the at least two groups of pixels having the lowest violation score to represent the given template in all instances in said recognized document for which a group of pixels has been identified as corresponding to said given template such that an appearance of a document generated from said recognized document is ameliorated.

2. The apparatus as in claim 1, wherein the violation means also stores, in the memory, the violation score together with the group of pixels as candidate information for the corresponding reference template.

3. The apparatus as in claim 1, further comprising:

replacement means for replacing, in said situation where said at least two groups of pixels have been identified as corresponding to said given template, the non-selected groups of pixels corresponding to said given template with the selected group of pixels.

4. The apparatus as in claim 1, wherein:

the input stream originates as an optical signal;

the apparatus further comprising:

conversion means, to which the identification means is responsive, for converting the optical signal into an electrical signal.

5. The apparatus as in claim 1, wherein the reference templates are defined according to a grammar.

6. The apparatus as in claim 1, wherein the reference templates represent different combinations of sizes and styles of alphanumeric characters.

7. The apparatus as in claim 1, wherein the reference templates represent different combinations of sizes and styles of graphical symbols.

8. The apparatus as in claim 1, wherein the input stream is an electrical signal representing text information.

9. A method for pattern recognition comprising:

storing, in a memory, reference templates corresponding to all available alphanumeric characters;

identifying each group of pixels in an input stream as corresponding to one of the templates such that a recognized document is produced;

assigning, after said step of identifying, a violation score to each identified group of pixels according to a degree of similarity between the identified group of pixels and the corresponding reference template;

comparing, in a situation where at least two groups of pixels have been identified as corresponding to a given template, the violation scores of the at least two groups of pixels corresponding to the given template; and selecting, in said situation where said at least two groups of pixels have been identified as corresponding to said a given template, the at least two groups of pixels having the lowest violation score to represent the given template in all instances in said recognized document for which a group of pixels has been identified as corresponding to said given template such that an appearance of a document generated from said recognized document is ameliorated.

10. The method as in claim 9, wherein the step of assigning includes storing, in the memory, the violation score together with the group of pixels as candidate information for the corresponding reference template.

11. The method as in claim 9, further comprising:

replacing, in said situation where said at least two groups of pixels have been identified as corresponding to said given template, the non-selected groups of pixels corresponding to said given template with the selected group of pixels.

12. The method as in claim 9, wherein:

the input stream originates as an optical signal;

the method further comprising:

converting the optical signal into an electrical signal.

13. The method as in claim 9, wherein the reference templates are defined according to a grammar.

14. The method as in claim 9, wherein the reference templates represent different combinations of sizes and styles of alphanumeric characters.

15. The method as in claim 9, wherein the reference templates represent different combinations of sizes and styles of graphical symbols.

16. The method as in claim 9, wherein the input stream is an electrical signal representing text information.

* * * * *